United States Patent
Nakamura

(10) Patent No.: US 11,422,441 B2
(45) Date of Patent: Aug. 23, 2022

(54) IMAGE DISPLAY APPARATUS WITH REFLECTION REGIONS

(71) Applicant: Sony Corporation, Tokyo (JP)

(72) Inventor: Tomoharu Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/047,302

(22) PCT Filed: Mar. 27, 2019

(86) PCT No.: PCT/JP2019/013224
§ 371 (c)(1),
(2) Date: Oct. 13, 2020

(87) PCT Pub. No.: WO2019/202935
PCT Pub. Date: Oct. 24, 2019

(65) Prior Publication Data
US 2021/0116798 A1    Apr. 22, 2021

(30) Foreign Application Priority Data

Apr. 16, 2018 (JP) .............................. JP2018-078519

(51) Int. Cl.
*G03B 21/14* (2006.01)
*G02B 30/35* (2020.01)
(Continued)

(52) U.S. Cl.
CPC ............. *G03B 21/14* (2013.01); *G02B 30/35* (2020.01); *G03B 21/28* (2013.01); *G03B 21/62* (2013.01); *G03H 1/0248* (2013.01)

(58) Field of Classification Search
CPC ........ G03B 21/14; G03B 21/28; G03B 21/00; G03B 21/62; G03B 35/18; G02B 27/4205;
(Continued)

(56) References Cited

U.S. PATENT DOCUMENTS 6,644,816 B1 * 11/2003 Perra .................. G09F 19/18
349/5
2005/0094111 A1 * 5/2005 May .................. G03B 37/04
353/98
(Continued)

FOREIGN PATENT DOCUMENTS

CN    1311888 A    9/2001
CN    1673848 A    9/2005
(Continued)

OTHER PUBLICATIONS

International Search Report issued in International Patent Application No. PCT/JP2019/013224 dated May 14, 2019 and English translation of same. 6 pages.

(Continued)

*Primary Examiner* — Magda Cruz
(74) *Attorney, Agent, or Firm* — K&L Gates LLP

(57) ABSTRACT

An image display apparatus according to an embodiment of the present technology includes: a light emission unit; an object to be irradiated; and a reflection portion. The light emission unit emits image light along a predetermined axis. The object to be irradiated is disposed at least partially around the predetermined axis. The reflection portion is disposed facing the light emission unit with reference to the predetermined axis and has a plurality of reflection regions that divides the emitted image light into a plurality of light beams and reflects the light beams toward the object to be irradiated.

19 Claims, 9 Drawing Sheets

(51) Int. Cl.
*G03B 21/28* (2006.01)
*G03B 21/62* (2014.01)
*G03H 1/02* (2006.01)

(58) Field of Classification Search
CPC ........ G02B 5/10; G02B 30/35; G03H 1/0248; G09F 9/00; H04N 5/74; H04N 13/346; H04N 13/363
See application file for complete search history.

(56) References Cited

U.S. PATENT DOCUMENTS

| | | | | |
|---|---|---|---|---|
| 2005/0219473 | A1* | 10/2005 | Moriyama | G03B 21/10 353/79 |
| 2013/0033650 | A1* | 2/2013 | Roberts | G03B 21/625 348/744 |
| 2017/0208292 | A1 | 7/2017 | Smits | |
| 2019/0391313 | A1* | 12/2019 | Nakamura | G03B 21/62 |
| 2020/0020262 | A1* | 1/2020 | Yano | G02B 5/0278 |

FOREIGN PATENT DOCUMENTS

| | | |
|---|---|---|
| CN | 1873527 A | 12/2006 |
| CN | 101038421 A | 9/2007 |
| CN | 101256343 A | 9/2008 |
| CN | 101794065 A | 8/2010 |
| CN | 103718104 A | 4/2014 |
| JP | 2003-29335 | 1/2003 |
| JP | 2004-12477 | 1/2004 |
| JP | 2005-274692 | 10/2005 |
| JP | 2006-235566 | 9/2006 |
| JP | 2009-145368 | 7/2009 |
| JP | 2014-514598 | 6/2014 |

OTHER PUBLICATIONS

Written Opinion issued in International Patent Application No. PCT/JP2019/013224 dated May 14, 2019. 4 pages.

* cited by examiner

IMAGE DISPLAY APPARATUS WITH REFLECTION REGIONS

TECHNICAL FIELD

The present technology relates to an image display apparatus that displays an image on a screen or the like.

BACKGROUND ART

In the past, a technology for projecting an image onto a screen or the like of various shapes has been developed. For example, by projecting an image on a side surface of a cylindrical screen, it is possible to enjoy an entire circumference image displayed in all directions of 360 degrees.

Patent Literature 1 describes an entire circumference video drawing device for displaying video on an entire circumference screen having a rotator shape. In the entire circumference video drawing device described in Patent Literature 1, a rotating body reflection mirror is installed on the overhead part of the entire circumference screen so that the protruding surface faces downward. Projection light projected from below the entire circumference screen by an image projection unit is reflected over the entire circumference of the entire circumference screen by the rotating body reflection mirror. This makes it possible to display video stereoscopically (paragraphs [0025], [0033], and [0040] of the specification, FIG. 1, and the like of Patent Literature 1).

CITATION LIST

Patent Literature

Patent Literature 1 Japanese Patent Application Laid-open No. 2004-12477

DISCLOSURE OF INVENTION

Technical Problem

Such a technology for displaying images on an entire circumference screen or the like is expected to be applied in a wide range of fields such as advertising and amusement, and there is a need for a technology capable of realizing highly entertaining image display.

In view of the circumstances as described above, it is an object of the present technology to provide an image display apparatus capable of realizing highly entertaining image display on an entire circumference screen or the like.

Solution to Problem

In order to achieve the above-mentioned object, an image display apparatus according to an embodiment of the present technology includes: a light emission unit; an object to be irradiated; and a reflection portion.

The light emission unit emits image light along a predetermined axis.

The object to be irradiated is disposed at least partially around the predetermined axis.

The reflection portion is disposed facing the light emission unit with reference to the predetermined axis and has a plurality of reflection regions that divides the emitted image light into a plurality of light beams and reflects the light beams toward the object to be irradiated.

In this image display apparatus, the image light emitted from the light emission unit along the predetermined axis enters the reflection portion disposed facing the light emission unit. The reflection portion is provided with the plurality of reflection region. The image light that has entered the plurality of reflection regions is split into a plurality of light beams and reflected toward the object to be irradiated disposed at least partially around the predetermined axis. In this manner, by dividing and irradiating the image light, it is possible to realize highly entertaining image display on the entire circumference screen or the like.

The plurality of reflection regions may include a first reflection region that reflects the image light and emits a first light beam, and a second reflection region that reflects the image light and emits a second light beam traveling along a direction different from that of the first light beam.

As a result, it is possible to control the traveling direction and the like of the respective light beams emitted from the respective reflection regions, and appropriately divide the respective light beams.

The object to be irradiated may have a first diffusion surface that diffuses light entering the first diffusion surface at a first angle. In this case, the first reflection region may emit a substantially-parallel light beam that enters the first diffusion surface at the first angle as the first light beam.

As a result, it is possible to realize highly-accurate image display using the first light beam, and for example, sufficiently improve the quality of images displayed on the object to be irradiated.

The first reflection region may be configured to have a shape of a parabola in which a cross-sectional shape of a plane including the predetermined axis is a recessed shape when viewed from the light emission unit, and an axis of the parabola and the predetermined axis may be different from each other.

As a result, it is possible to emit the substantially-parallel light beam with high accuracy. As a result, it is possible to realize high-quality image display on the entire circumference screen or the like.

The first light beam may be a light beam that displays a main image.

As a result, it is possible to display the main image on the entire circumference screen or the like, and realize highly entertaining image display.

The first diffusion surface may cause light that has entered the object to be irradiated within a second angle range to be transmitted therethrough, the second angle range being different from a first angle range including the first angle. In this case, the second reflection region may reflect the image light and emit the second light beam that enters the first diffusion surface within the second angle range.

As a result, it is possible to, for example, perform images display in another region different from the first control surface using the second light beam, and improve entertainment.

The second reflection region may emit, as the second light beam, a substantially-parallel light beam that enters the first diffusion surface at a second angle included in the second angle range.

As a result, it is possible to appropriately display an image using the second light beam, for example.

The object to be irradiated may have a second diffusion surface that diffuses light entering the object to be irradiated at the second angle.

As a result, it is possible to, for example, superimpose and display images, for example, and exhibit an excellent visual effect.

The second reflection region may emit, as the second light beam, a divergent light beam that enters the first diffusion surface within the second angle range.

As a result, it is possible to, for example, expand and apply the second light beam, and easily widen the range of effects of performance using the second light beam, or the like.

The second reflection region may have a shape in which a cross-sectional shape of a plane including the predetermined axis is a protruding shape when viewed from the light emission unit.

As a result, it is possible to, for example, easily adjust the application range of the second light beam.

The second reflection region may emit, as the second light beam, a converging light beam that enters the first diffusion surface within the second angle range.

As a result, for example, it is possible to apply the second light beam in an enlarged or reduced size, enlarge the range of display using the second light beam, and increase the brightness.

The second reflection region may have a shape in which a cross-sectional shape of a plane including the predetermined axis is a recessed shape when viewed from the light emission unit.

As a result, for example, it is possible to easily adjust the application range, brightness, and the like of the second light beam.

The second light beam may be a light beam that displays at least one of a sub-image, a superimposed image, an indicator, or illumination.

As a result, it is possible to display sub-content such as a sub-image on the entire circumference screen or the like, and realize highly entertaining image display.

The reflection portion may have a rotation surface with reference to the predetermined axis. In this case, the plurality of reflection regions may be provided on the rotation surface.

As a result, it is possible to, for example, display an image in all directions on the entire circumference screen or the like that is rotation-symmetrical with reference to the predetermined axis.

The first reflection region may be disposed on a periphery of the rotation surface. In this case, the second reflection region may be disposed at a center of the rotation surface.

As a result, for example, a main image or the like is displayed by using image light projected on the periphery of the rotation surface. As a result, it is possible to, for example, display an image with a high resolution on the entire circumference screen or the like, and realize high-quality image display.

The object to be irradiated may diffuse light of different wavelengths entering the object to be irradiated at different angles. In this case, the plurality of reflection regions may emit the plurality of light beams of different wavelengths to a predetermined irradiation range on the object to be irradiated.

As a result, it is possible to display a color image high brightness and the like in the irradiation range of the object to be irradiated, and realize high-quality image display on the entire circumference screen or the like.

The object to be irradiated may be disposed over the entire circumference around the predetermined axis.

As a result, an entire circumference screen is configured around the predetermined axis, and it is possible to enjoy an entire circumference image and the like.

The object to be irradiated may have a cylindrical shape with the predetermined axis as a central axis.

As a result, it is possible to realize high-quality image display on a cylindrical entire circumference screen or the like.

The object to be irradiated may be a screen using a diffractive optical element.

By using a diffractive optical element, it is possible to realize sufficiently-high-quality image display.

Advantageous Effects of Invention

As described above, in accordance with the present technology, it is possible to realize highly entertaining image display on an entire circumference screen or the like. Note that the effect described here is not necessarily limitative, and any of the effects described in the present disclosure may be provided.

MODE(S) FOR CARRYING OUT THE INVENTION

Embodiments according to the present technology will now be described below with reference to the drawings.

First Embodiment

[Configuration of Image Display Apparatus]

Figure 1:
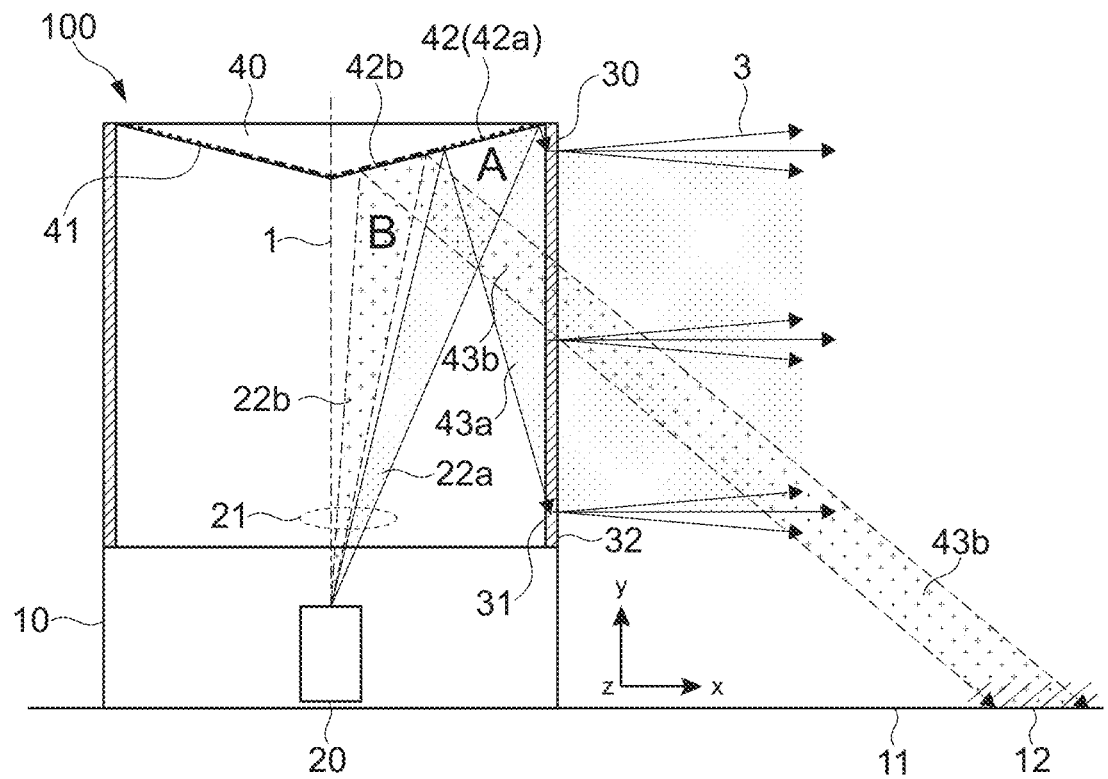
FIG. 1 is a diagram schematically showing the appearance of an image display apparatus according to a first embodiment of the present technology.

FIG. 1 is a diagram schematically showing the appearance of an image display apparatus 100 according to a first embodiment of the present technology. The image display apparatus 100 is capable of displaying an entire circumference image displayed in all directions of 360 degrees.

The image display apparatus 100 is used by being disposed on a desk, a floor, or the like. In this embodiment, the direction of the plane on which the image display apparatus 100 is disposed (the XZ plane) will be described as the horizontal direction, and the direction (the Y direction) perpendicular to the horizontal direction will be described as the up-and-down direction. It goes without saying that the present technology is applicable regardless of the orientation in which the image display apparatus 100 is disposed.

The image display apparatus 100 includes a pedestal 10, a light emission unit 20, a screen 30, and a reflection mirror 40.

The pedestal 10 has a cylindrical shape and is provided in the lower part of the image display apparatus 100. The pedestal 10 holds the light emission unit 20, the screen 30, and the reflection mirror 40 by an arbitrary holding mechanism (not shown). Further, the pedestal 10 is appropriately provided with a power source such as a battery (not shown), a speaker, and other elements required for the operation of the image display apparatus 100. The shape or the like of the pedestal 10 is not limited, and an arbitrary shape such as a rectangular parallelepiped shape may be used.

The light emission unit 20 is installed facing upward at a position substantially in the center of the cylindrical pedestal 10. The light emission unit 20 emits image light 21 forming an image along an optical axis 1 extending in the up-and-down direction (Y direction). In this embodiment, the optical axis 1 corresponds to the predetermined axis. The light emission unit 20 functions as video projector (projector) that projects video or the like by projecting (emitting) the image light 21 upward.

FIG. 1 illustrates a cross section of the image display apparatus 100 taken along an arbitrary plane including the optical axis 1. The light emission unit 20 emits the image light 21 radially along the optical axis 1. Therefore, in the arbitrary plane including the optical axis 1, the image light 21 is emitted from the light emission unit 20 at a predetermined angle of view.

FIG. 1 schematically illustrates the image light 21 emitted to one side (right side in the figure) of a cross section including the optical axis 1, which is divided with reference to the optical axis 1. In addition, in FIG. 1, the illustration of the image light 21 emitted to the other side (left side in the figure) of the cross section is omitted. Actually, the light emission unit 20 emits the image light 21 over the entire circumference of the optical axis 1. Therefore, in the cross section including the optical axis 1, the image light 21 is emitted at a predetermined angle of view with respect to both sides of the optical axis 1.

As the light emission unit 20, for example, a color projector of a laser scanning system that displays each pixel by scanning laser light corresponding to each color of RGB is used. The specific configuration of the light emission unit 20 is not limited. For example, a small mobile projector (pico projector) or a projector using single-color laser light may be used as appropriate in accordance with the size of the image display apparatus 100, applications, and the like. Alternatively, an arbitrary projector capable of projecting the image light 21 may be used.

For example, as the light emission unit 20, a projector including a light emitting element using an LD (Laser Diode), an LED (Light Emitting Diode), or the like, and a light modulating element using MEMS (Micro Electro Mechanical Systems), a DMD (Digital Mirror Device), reflective liquid crystal, transmission liquid crystal, or the like may be used as appropriate. That is, a projector or the like having a configuration such as LD+MEMS, LD+DMD, LD+reflective liquid crystal, LD+transmission liquid crystal, LED+MEMS, LED+DMD, LED+reflective liquid crystal, and LED+transmission liquid crystal may be used. It goes without saying that the present technology is applicable also when a projector having another configuration is used.

The screen 30 has a cylindrical shape and is disposed over the entire circumference around the optical axis 1. The screen 30 includes an inner peripheral surface 31 and an outer peripheral surface 32. The inner peripheral surface 31 and the outer peripheral surface 32 are respectively surfaces inside and outside the cylindrical screen 30.

In this embodiment, the screen 30 is provided so that the central axis of the screen 30 (having a cylindrical shape) and the optical axis 1 of the light emission unit 20 substantially coincide. In the example shown in FIG. 1, the screen 30 having a diameter similar to that of the pedestal 10 is shown. The present technology is not limited thereto, and the diameter, height, and the like of the screen 30 may be appropriately set. In this embodiment, the screen 30 corresponds to the object to be irradiated.

The screen 30 is a screen using a diffractive optical element. The diffractive optical element (DOE) is an optical element that diffracts light. As the diffractive optical element, for example, a holographic optical element (HOE) for diffracting light using interference fringes recorded on a hologram is used.

The specific configuration of the diffractive optical element is not limited. For example, a volume-type HOE in which interference fringes are recorded inside the element or a relief-type (embossing-type) HOE in which interference fringes are recorded by using unevenness or the like of the element surface may be used. For these HOEs, for example, a material such as a photopolymer (photosensitive material or the like) and a UV curable resin can be used. Further, in addition to diffraction by interference fringes, a diffractive optical element or the like of the type for diffracting light using a diffraction grating or the like of predetermined pattern may be used.

In this embodiment, a transmission hologram (transmission-type HOE) is used as a diffractive optical element. Therefore, the screen 30 functions as a hologram screen using a transmission hologram.

Figure 2:
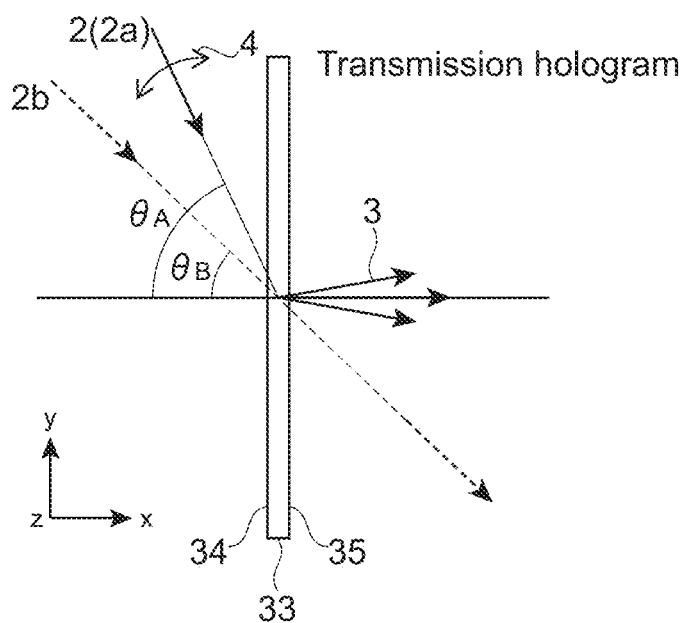
FIG. 2 is a schematic diagram showing a configuration example of a transmission hologram.

FIG. 2 is a schematic diagram showing a configuration example of a transmission hologram 33. For example, interference fringes of diffused light by a diffusion plate are recorded on the transmission hologram 33, and the transmission hologram 33 has a diffusion function of diffracting an incident light 2 and emitting the diffracted incident light 2 as a diffused light 3. By emitting the diffused light 3, it is possible to display an image on the transmission hologram 33 (the screen 30). Note that the diffused light 3 emitted from the transmission hologram 33 is first-order diffracted light (first-order light) that has been subjected to first-order diffraction by the interference fringes.

FIG. 2 schematically illustrates incident lights 2a and 2b that enter the transmission hologram 33 at incident angle $\theta_A$ and $\theta_B$, and the diffused light 3. Here, the incident angle is, for example, an angle between a normal line of the transmission hologram 33 (the screen 30) and an optical path of the incident light 2 at a position where the incident light 2 enters. For example, the incident angle of the incident light 2 that enters the transmission hologram 33 perpendicularly is 0°.

The transmission hologram 33 has a first surface 34 that the incident lights 2a and 2b enter and a second surface 35 from which the diffused light 3 is emitted. The first surface 34 corresponds to the inner peripheral surface 31 inside the screen 30 in FIG. 1, and the second surface 35 corresponds to the outer peripheral surface 32 outside the screen 30.

In this embodiment, the transmission hologram 33 is configured to diffract the incident light 2a that enters the first surface 34 at the incident angle $\theta_A$, and emit the diffracted incident light 2a from the second surface 35 as the diffused light 3. Therefore, the first surface 34 of the transmission hologram 33, i.e., the inner peripheral surface 31 of the screen 30 functions as a diffusion surface that diffuses light entering the inner peripheral surface 31 at the incident angle $\theta_A$. In this embodiment, the inner peripheral surface 31 of the screen 30 corresponds to the first diffusion surface, and the incident angle $\theta_A$ corresponds to the first angle.

The incident angle $\theta_A$ is set in accordance with a parameter such as the diameter and height of the screen 30. The method and the like of setting the incident angle $\theta_A$ are not limited, and the incident angle $\theta_A$ may be set in accordance with, for example, characteristics of the transmission hologram 33 or the reflection mirror 40 described below. Alternatively, the incident angle $\theta_A$ may be appropriately set in accordance with the arrangement, design, and the like of the respective portions of the image display apparatus 100.

Further, the transmission hologram 33 is capable of diffracting the incident light 2 that has entered the first surface 34 within a predetermined angle range including the incident angle $\theta_A$. That is, the incident light 2 having the incident angle included in the predetermined angle range is diffracted by the transmission hologram 33. In FIG. 2, the predetermined angle range including the incident angle $\theta_A$ is schematically illustrated using an arrow 4. In the following, the predetermined angle range will be referred to as the diffraction angle range 4, using the same reference symbol as the arrow 4. In this embodiment, the diffraction angle range 4 corresponds to the first angle range.

The diffraction efficiency of the transmission hologram 33 varies in accordance with the incident angle of the incident light 2. Here, the diffraction efficiency is an amount representing the ratio of the diffraction of the incident light 2 by the transmission hologram 33. For example, the diffraction efficiency is calculated on the basis of the ratio of the light intensity of the incident light 2 and the light intensity of the diffused light 3. The diffraction efficiency show, for example, angle distribution having a peak value at a predetermined incident angle (see FIG. 5 and FIG. 7).

The diffraction angle range 4 is set in accordance with this angle distribution of the diffraction efficiency. For example, a range in which the diffraction efficiency is equal to or higher than a predetermined reference value (e.g., 20% or 10%) around the angle at which the diffraction efficiency has a peak value is set as the diffraction angle range 4. Therefore, the incident light 2 that has entered the first surface 34 within the incident angle included in the diffraction angle range 4 is diffracted at at least a ratio equal to or higher than the predetermined reference value, and is emitted as the diffused light 3. Note that the method of setting the diffraction angle range 4 or the like is not limited.

Meanwhile, the incident light 2 at an incident angle deviating from the diffraction angle range 4 passes through the transmission hologram 33 as it is substantially without being diffracted. In the following, the angle range of the incident angle different from the diffraction angle range 4 will be described as the transmission angle range. In this embodiment, the transmission angle range corresponds to the second angle range.

The transmission angle range is, for example, an angle range set so as not to overlap with the diffraction angle range 4. For example, the angle range excluding the diffraction angle range 4 in the angle range in which the incident angle with respect to the first surface 34 (the inner peripheral surface 31) is from +90° to −90° is the transmission angle range.

Therefore, the first surface 34 of the transmission hologram 33, i.e., the inner peripheral surface 31 of the screen 30 causes the incident light 2 that has entered the inner peripheral surface 31 within the transmission angle range different from the diffraction angle range 4 including the incident angle $\theta_A$ to be transmitted therethrough. Thus, it can also be said that the transmission hologram 33 is transparent for the incident light that has entered the transmission hologram 33 within the transmission angle range.

As shown in FIG. 2, the incident angle $\theta_B$ is not included in the diffraction angle range 4. In other words, the incident angle $\theta_B$ is an angle included in the transmission angle range. The incident light 2b that has entered the first surface 34 (the inner peripheral surface 31) at the incident angle $\theta_B$ passes through the transmission hologram 33 without changing the traveling direction or the like before and after the entering. That is, the incident light 2b travels straight through the transmission hologram 33 as light that is not diffracted. It can also be said that the incident light 2b that has passed through the transmission hologram 33 is the zero-order diffracted light (zero-order light) that has been subjected to the zero-order diffraction by the interference fringes.

It goes without saying that not only the incident light 2b but also light that has entered the transmission hologram 33 at an incident angle that is not included in the diffraction angle range 4 (included in the transmission angle range) is transmitted through the transmission hologram 33 substantially without being diffracted. Further, for example, external light such as ceiling illumination that has entered the transmission hologram 33 from the upper right in the figure is hardly affected by diffraction. Therefore, the transmission hologram 33 is substantially transparent to the external light that obliquely enters the transmission hologram 33.

Thus, the transmission hologram 33 exhibits a high incident angle selectivity that the incident light 2 is diffracted or transmitted therethrough depending on the incident angle. Therefore, for example, by controlling the incident angle with respect to the transmission hologram 33, it is possible to simultaneously establish diffusion diffraction (scattered diffraction) that converts the incident light 2 into the diffused light 3 and transmission of the incident light 2.

Note that in the case where the incident light 2 of different wavelengths is incident at the same incident angle, the ratio at which the incident light 2 is diffracted varies in some cases depending on the wavelength. That is, the angle distribution of the diffraction efficiency of the transmission hologram 33 exhibits wavelength-dependence. Therefore, for example, in the case where the image light 21 that displays a color image or the like is emitted, the transmission hologram 33 is designed in accordance with the diffraction efficiency of light of each color, i.e., red light (R:Red), green light (G:Green), and blue light (B:Blue), which are included in the image light 21.

For example, the transmission hologram 33 is appropriately configured so that light of each color of RGB that has entered the transmission hologram 33 at the incident angle $\theta_A$ is diffracted with proper balance and high efficiency. That is, it can also be said that the transmission hologram 33 is configured so that a color image can be properly displayed using the image light 21 that has entered the transmission hologram 33 at the incident angle $\theta_A$. As a result, it is possible to realize high-quality image display on the transmission hologram 33 (the screen 30).

In the case where a volume-type hologram using a photosensitive material or the like is used as the transmission hologram 33, object light and reference light having predetermined exposure wavelengths enter one surface (the first surface 34) of the sheet-like photosensitive material. As the object light, diffused light generated by using a diffusion plate or the like is used. As a result, interference fringes caused by the object light (diffused light) and the reference light are exposed to the photosensitive material, and a transmission hologram having a diffusion function is generated.

By appropriately setting the incident angle of the reference light when exposing the interference fringes, the exposure wavelength, and the like, for example, it is possible to form the transmission hologram 33 or the like that diffracts the image light 21 (light of the respective colors R, G, and B) at the incident angle $\theta_A$ most efficiently with appropriate balance. In addition, the method of forming the transmission hologram 33 is not limited, and the transmission hologram 33 may be appropriately configured so that images can be displayed with desired accuracy.

With reference to FIG. 1 again, the screen 30 (hologram screen) is formed using, for example, a hologram film. The hologram film is a thin film-like material, and is formed of, for example, a base film coated with a photopolymer. Exposure of the interference fringes to the hologram film is performed by attaching the hologram film to a highly-flat substrate such as glass. The cylindrical screen 30 is formed by peeling the hologram film on which the interference fringes are recorded off from the substrate and attaching the hologram film to a transparent base material having a cylindrical shape (transparent cylindrical base material). Note that in FIG. 1, illustration of the transparent cylindrical base material is omitted.

The hologram film (the transmission hologram 33) is attached to, for example, the inside or the outside of the cylindrical base material. As a result, it is possible to easily form the cylindrical screen 30 using the transmission hologram 33. Further, for example, a photopolymer or the like may be directly applied to the transparent cylindrical base material. In this case, a hologram layer formed of a photopolymer is formed inside or outside the transparent cylindrical base material.

For example, it is possible to expose interference fringes to a photopolymer while the photopolymer has been applied to the transparent cylindrical base material. Thus, the base film is unnecessary and the number of parts can be reduced. In addition, since the attaching process is not necessary, it is possible to simplify the production step and suppress the production costs of the screen 30. In addition, the type of the hologram, the method of forming the screen 30, and the like are not limited. Hereinafter, a volume-type transmission hologram 33 will be described as an example. It goes without saying that the present technology is applicable also in the case where another type of hologram or the like is used.

The reflection mirror 40 has a reflection surface 41 that reflects the image light 21 emitted by the light emission unit 20 and a plurality of reflection regions 42. The reflection mirror 40 is disposed facing the light emission unit 20 with reference to the optical axis 1 so that the reflection surface 41 faces the light emission unit 20. In this embodiment, the reflection mirror 40 corresponds to the reflection portion.

The reflection surface 41 has a rotation-symmetrical shape with reference to the optical axis 1. That is, the reflection surface 41 is a rotation surface with reference to an optical axis. This allows the image light 21 to be reflected over the entire circumference of the screen 30. The diameter of the reflection surface 41 is set, for example, similarly to the diameter of the screen 30.

The plurality of reflection regions 42 divides the emitted image light 21 into a plurality of light beams and reflects it toward the screen 30. Here, the light beam is, for example, a bundle of light rays displaying the respective pixels (light ray bundle). The light beam includes a parallel light beam that travels in a direction parallel to a predetermined traveling axis of (substantially-parallel light beam), a divergent light beam radiating with reference to the predetermined traveling axis, and a converging light beam that travels and converges with reference to the predetermined traveling axis.

The plurality of reflection regions 42 is provided on the reflection surface 41 of the reflection mirror 40. That is, it can also be said that the reflection surface 41 of the reflection mirror 40 is divided into a plurality of regions so that the image light 21 is divided into a plurality of light beams and reflected. Therefore, image light that has entered each region on the reflection surface 41 is reflected as a light beam corresponding to the characteristics of the region.

In this embodiment, a first reflection region 42a and a second reflection region 42b are provided as the plurality of reflection regions 42. In FIG. 1, a cross section of the first reflection region 42a (a region of a fine dotted line) and a cross section of the second reflection region 42b (a region of a coarse dotted line) provided on the reflection surface 41 are schematically illustrated using straight lines. Actually, the cross-sections of the respective reflection regions are appropriately set so as to be capable of reflecting the incoming image light 21 as a desired light beam. This will be described below in detail.

As shown in FIG. 1, the first reflection region 42a is disposed on the periphery of the reflection surface 41. Further, the second reflection region 42b is disposed at the center of the reflection surface 41. That is, on the reflection surface 41 that is a rotation surface with reference to the optical axis 1, the second reflection region 42b and the first reflection region 42a are disposed in this order from the optical axis 1 to the outer periphery. Therefore, the circular region at the center of the reflection surface 41 when viewed from the light emission unit 20 is the second reflection region 42b, and the ring-shaped region on the outer side thereof is the first reflection region 42a.

The first reflection region 42a reflects the image light 21 and emits a first light beam 43a. Specifically, the first reflection region 42a emits, as the first light beam 43a, a substantially-parallel light beam that enters the inner peripheral surface 31 of the screen 30 at the incident angle $\theta_A$.

For example, of the image light 21 emitted from the light emission unit 20, the image light 21 projected onto the first reflection region 42a is reflected by the first reflection region 42a and is emitted as a substantially-parallel light beam (the first light beam 43a) that enters the inner peripheral surface 31 at the incident angle $\theta_A$. Hereinafter, the image light 21 projected onto the first reflection region 42a will be referred to as the first projection light 22a. In FIG. 1, the first projection light 22a and the first light beam 43a are schematically illustrated using patterns of dots.

As described with reference to FIG. 2 and the like, the incident light 2 that has entered the inner peripheral surface 31 at the incident angle $\theta_A$ is diffracted by the screen 30 (the transmission hologram 33), and is emitted from the outer peripheral surface 32 as the diffused light 3. Therefore, an image by the first light beam 43a (the first projection light 22a) is displayed on the outer peripheral surface 32 of the screen 30. As a result, a user who observes the screen 30 from the outside can visually recognize an entire circumference image displayed over the entire circumference of the screen 30.

Note that in the present disclosure, the substantially-parallel light beam includes a light beam including, for example, a ray of light that enters the screen 30 at an incident angle within an angle range (allowable angle range) in which image display can be properly executed. That is, a set of rays of light incident at an incident angle within the allowable angle range is also included in the substantially-parallel light beam. In addition, in the present disclosure, the term "substantially-parallel" includes "parallel". That is, the substantially-parallel light beam includes a parallel light beam.

The allowable angle range is set in accordance with, for example, the diffraction characteristics of the hologram screen (the screen 30). As described above, the diffraction efficiency of the screen 30 has angle distribution regarding the incident angle. Therefore, for example, it is possible to diffract, with high diffraction efficiency, also the light that has entered the screen 30 at an incident angle slightly shifted from the incident angle $\theta_A$ and emit the diffracted light as the diffused light 3.

For example, the angle range in which the diffraction efficiency of light of all RGB colors is 50% or more is set as the allowable angle range. As a result, 50% or more of the first light beam 43a (the image light 21) that has entered the screen 30 is diffracted, and appropriate image display can be performed. The method or the like of setting the allowable angle range is not limited, and for example, the allowable angle range may be set with reference to the diffraction efficiency such as 40% and 30%. In addition, the allowable angle range may be set by using an arbitrary method so that proper image display can be performed.

The second reflection region 42b reflects the image light 21 and emits a second light beam 43b traveling along a direction different from that of the first light beam 43a. Specifically, the second reflection region 42b reflects the image light 21 and emits the second light beam 43b that enters the inner peripheral surface 31 of the screen 30 within the transmission angle range. That is, it can also be said that the second reflection region 42b reflects the image light 21 emitted from the light emission unit 20 so that the second light beam 43b, which is the reflected light, is transmitted through the screen 30 (the transmission hologram 33).

In the example shown in FIG. 1, as the second light beam 43b, a substantially-parallel light beam that enters the inner peripheral surface 31 of the screen 30 at the incident angle $\theta_B$ included in the transmission angle range is emitted. Note that the present technology is not limited to the case where a substantially-parallel light beam is emitted as the second light beam 43b. For example, a divergent light beam, a converging light beam, or the like may be emitted as the second light beam 43b. The case where the second light beam 43b is a divergence light beam and a convergence light beam will be described below in detail with reference to FIG. 6, FIG. 8, and the like.

For example, of the image light 21 emitted from the light emission unit 20, the image light 21 projected onto the second reflection region 42b is reflected by the second reflection region 42b, and emitted as a substantially-parallel light beam (the second light beam 43b) that enters the inner peripheral surface 31 at the incident angle $\theta_B$. Hereinafter, the image light 21 projected onto the second reflection region 42b will be referred to as a second projection light 22b. In FIG. 1, the second projection light 22b and the second light beam 43b are schematically illustrated using cross patterns.

The second light beam 43b that enters the inner peripheral surface 31 at the incident angle $\theta_B$ is emitted from the outer peripheral surface 32 as it is substantially without being diffracted by the screen 30 (the transmission hologram 33). FIG. 1 shows a state in which the second light beam 43b (the second projection light 22b) that has passed through the screen 30 is applied to the surface (disposition surface 11) on which the image display apparatus 100 is disposed. Hereinafter, the region on the disposition surface 11 to which the second light beam 43b is applied will be referred to as the external irradiation region 12. The external irradiation region 12 is, for example, a ring-shaped region that surrounds the entire circumference of the image display apparatus 100.

The specific configuration and the like of the reflection mirror 40 are not limited. For example, an arbitrary material such as a resin such as acrylic, glass, and metal may be used as the material forming the reflection mirror 40. For example, the reflection surface 41 (the first and second reflection regions 42a and 42b) is formed by performing mirror processing on the surface of the material so that a surface roughness Ra is less than 0.1 μm. In addition, an arbitrary material may be used for the reflection mirror 40 in accordance with, for example, processing accuracy, productivity, and the like.

Further, for example, the reflection surface 41 of the reflection mirror 40 may be subjected to high-reflectance coating with a thin film of aluminum, silver, or the like. As a result, it is possible to highly-efficiently reflect the image light 21 that has entered the reflection surface 41. Further, protective coating or the like for protecting the reflection surface 41 using a thin film such as a $SiO_2$ film and a polymerized film may be appropriately applied to the surface of the reflection surface 41. In addition, materials and the like for highly-reflective coating and protective coating are not limited.

Figure 3:
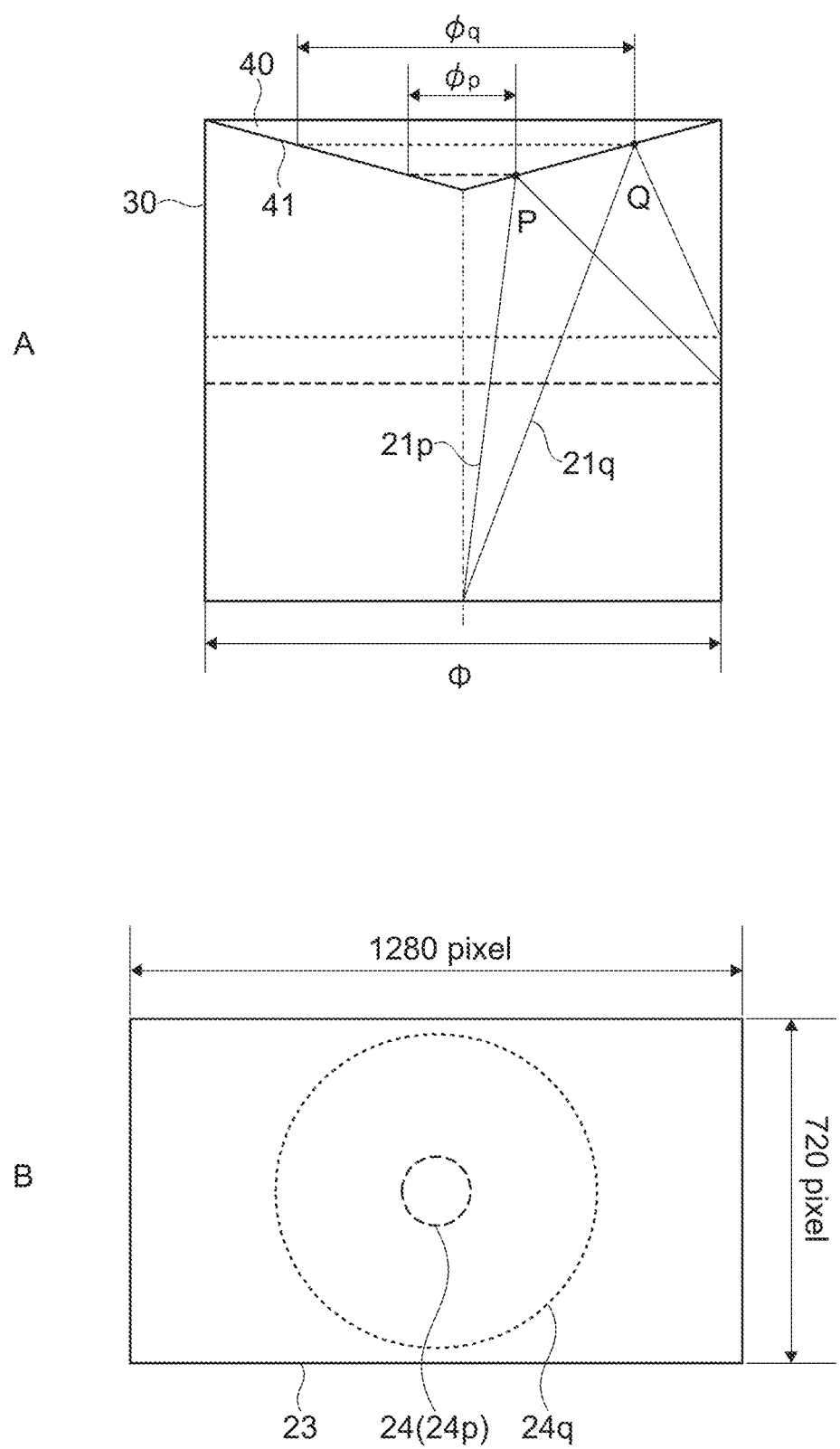
FIG. 3 is a schematic diagram for describing image light to be reflected by a reflection mirror.

FIG. 3 is a schematic diagram for describing the image light 21 reflected by the reflection mirror 40. Part A of FIG. 3 is a schematic diagram showing an arrangement relationship between the reflection mirror 40 and the screen 30 when the image display apparatus 100 is viewed from the side. Part B of FIG. 3 is a schematic diagram showing an example of image data projected onto the reflection mirror 40. Note that illustration of the pedestal 10 and the light emission unit 20 is omitted in Part A of FIG. 3.

In Part A of FIG. 3, an image light 21p projected onto a reflection position P close to the optical axis 1 of the reflection surface 41 and an image light 21q projected onto a reflection position Q farther from the optical axis 1 than the reflection position P are schematically illustrated. The image lights 21p and 21q are respectively reflected at the reflection positions P and Q, and emitted toward the screen 30 at an angle corresponding to the characteristics of each reflection position. In Part A of FIG. 3, the image lights 21p and 21q that have reached the screen 30 are schematically illustrated.

In the case where a rotation-symmetrical reflection surface 41 (rotator mirror) is used to cause the image light 21 to enter the cylindrical screen 30, the image light 21 is enlarged in the horizontal direction at a magnification corresponding to the reflection position on the reflection surface 41 and enters the screen 30. A magnification M in the horizontal direction is expressed, for example, as follows using a diameter φ of the reflection surface 41 at the reflection position and a diameter φ of the cylindrical screen 30.

$$M=\Phi/\varphi$$

For example, as shown in Part A of FIG. 3, the image light 21 that has entered the reflection position P close to the optical axis 1 is reflected at the reflection position P and is enlarged in the horizontal direction at a magnification $M_p=\Phi/\varphi_p$ before reaching the screen 30. Similarly, the image light 21 that has entered the reflection position Q away from the optical axis 1 is reflected at the reflection position Q and is enlarged in the horizontal direction at a magnification $M_q=\Phi/\varphi_q$ before reaching the screen 30.

As a result, the magnification $M_p$ in the horizontal direction at the reflection position P close to the optical axis 1 is larger than the magnification $M_q$ in the horizontal direction at the reflection position Q away from the optical axis 1 ($M_p>M_q$). Therefore, it can also be said that in the image light 21, the closer the reflection position is to the center of the reflection surface 41 (the optical axis 1), the higher the magnification when reaching the screen 30.

Image data 23 shown in Part B of FIG. 3 is, for example, the image data 23 input to the light emission unit 20. The image data 23 is the data in which an image signal 24 forming an image is stored. In Part B of FIG. 3, the image data 23 including pixels of 1280 pixels×720 pixels is illustrated. It goes without saying that the format of the image data 23, the number of pixels, and the like are not limited, and arbitrary image data 23 may be used.

In the image display apparatus 100, in order to correctly display video on the cylindrical screen 30, distortion correction processing is performed on the image signal 24. For example, in order to display a straight line horizontally on the entire circumference of the screen 30, a circular image signal 24 is required. Part B of FIG. 3 schematically illustrates circular image signals 24p and 24q on which the image lights 21p and 21q projected onto the reflection positions P and Q shown in Part A of FIG. 3 are based.

As shown in Part B of FIG. 3, the information (pixels) on the circumference representing the image signal 24p is less than the information (pixels) on the circumference representing the image signal 24q. Therefore, in the case where the image light 21p and the image light 21q are enlarged to the diameter Φ of the screen 30, the image light 21p projected in the vicinity of the center of the reflection surface 41 has fewer pixels and is coarser than the image light 21q projected at a position away from the center.

Since the image light 21 projected in the vicinity of the center of the reflection surface 41 has a small amount of information of the image signal 24 and the magnification M in the horizontal direction is large as described above, an image with a low resolution is formed on the screen 30.

Therefore, for example, when an image is displayed on the screen 30 using the image light 21 reflected in the vicinity of the center of the reflection surface 41, a coarse image is displayed in some cases.

In this embodiment, as described with reference to FIG. 1 and FIG. 2, the first light beam 43a reflected by the first reflection region 42a provided on the outer periphery of the reflection surface 41 is used as a light beam that displays an image on the screen 30. That is, an entire circumference image or the like as main content is displayed using the image light 21 reflected at a position away from the optical axis 1 of the reflection surface 41. As a result, it is possible to display an entire circumference image with a high resolution, and the like on the screen 30, and realize high-quality image display on the entire circumference screen.

In this manner, the first light beam 43a is a light beam that displays an entire circumference image. The content and the like of the entire circumference image are not limited, and for example, an arbitrary image such as a moving image including video in which a person or a character operates and a still image may be displayed as the entire circumference image. In this embodiment, the entire circumference image corresponds to the main image.

In this embodiment, the image light 21 (the second light beam 43b) reflected in the vicinity of the center (the second reflection region 42b) of the reflection surface 41 is transmitted through the screen 30. Therefore, an image using the second light beam 43b, and the like are not displayed on the screen 30. As a result, it is possible to avoid such a situation that the resolution of the image displayed on the screen 30 is reduced.

As shown in FIG. 1, the second light beam 43b that has been transmitted through the screen 30 is applied to the external irradiation region 12 of the disposition surface 11. That is, it is possible to display an image on the external irradiation region 12 using the second light beam 43b.

Examples of images displayed by the second light beam 43b include indicators indicating various states such as a battery state and a communication state of the image display apparatus 100, a time, a calendar, and the like. In addition, a sub-image (sub-content) such as an effect image, a subtitle, and a telop, which is displayed in accordance with the entire circumference image, may be displayed by using the second light beam 43b.

Further, the second light beam 43b may also be used to display illumination for illuminating the hand of a user. Further, for example, in the case where an user operation input on the external irradiation region 12 can be detected, an operating icon or the like for controlling volume, reproduction/stopping of content, or the like may be displayed on the external irradiation region 12. In addition, the image displayed by the second light beam 43b is not limited.

In this manner, the second light beam 43b is a light beam that displays a sub-image, an indicator, and the like. That is, by using the second light beam 43b, it is possible to display an image or the like which may have a low resolution or the like at a position other than the screen 30 (the external irradiation region 12). As a result, it is possible to exhibit high amusement performance and high usability.

Figure 4:
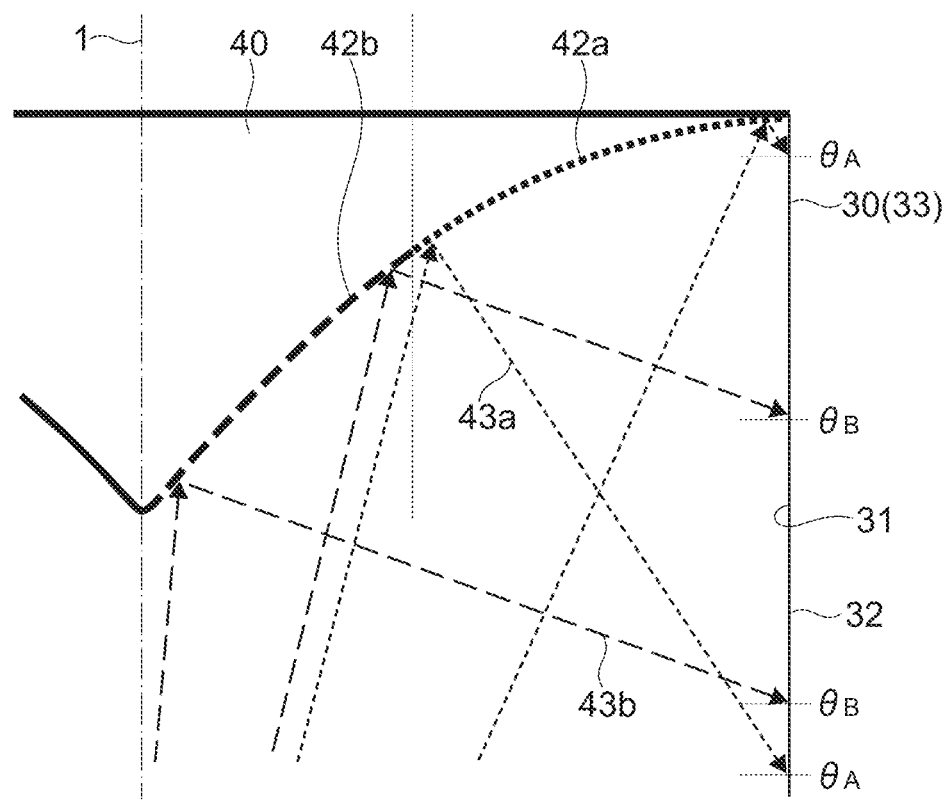
FIG. 4 is a schematic diagram showing a specific configuration example of the reflection mirror.
Figure 5:
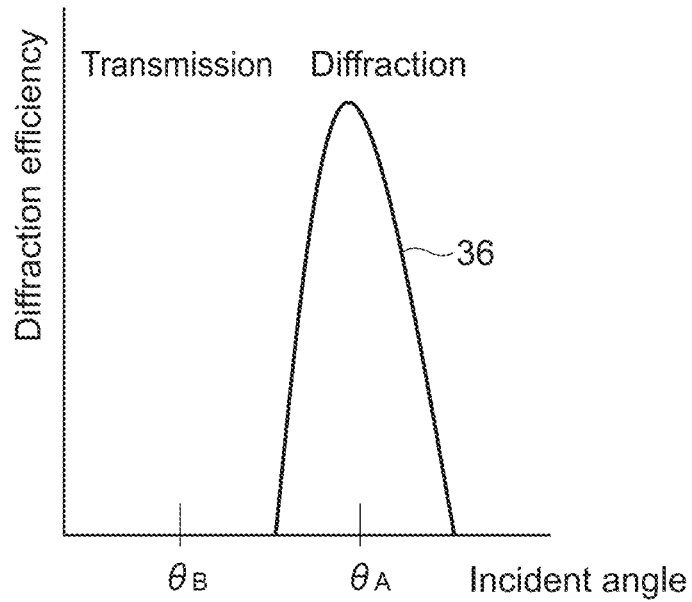
FIG. 5 is a graph showing the relationship between the incident angle of image light reflected by the reflection mirror shown in FIG. 4 and the diffraction efficiency of a screen.

FIG. 4 is a schematic diagram showing a specific configuration example of the reflection mirror 40. FIG. 5 is a graph showing the relationship between the incident angle of the image light 21 reflected by the reflection mirror 40 shown in FIG. 4 and the diffraction efficiency of the screen 30. FIG. 4 schematically illustrates the cross-sectional shapes of the reflection mirror 40 (the reflection surface 41) and the screen 30 taken along an arbitrary plane including the optical axis 1.

The first reflection region 42a is configured to be capable of emitting a substantially-parallel light beam (the first light beam 43a) of the incident angle $\theta_A$. In the example shown in FIG. 4, the first reflection region 42a is configured by using a curved line obtained by cutting out a part of a parabola. By using the parabola, it is possible to generate a substantially-parallel light beam with high accuracy. Hereinafter, the parabola constituting the first reflection region 42a will be referred to as a first parabola. In FIG. 4, a curved shape obtained by cutting out the first parabola constituting the first reflection region 42a is schematically illustrated using fine dotted lines.

The cross-sectional shape in the plane including the optical axis 1 of the first reflection region 42a is configured to be a part of the first parabola that has an apex protruding upward and is axially shifted from the optical axis 1. That is, the first reflection region 42a is configured to have a shape of the first parabola in which the cross-sectional shape of the plane including the optical axis 1 is a recessed shape when viewed from the light emission unit 20, the axis of the first parabola and the optical axis 1 being different from each other.

Note that the axial shifting means a state in which the axis of the parabola and the optical axis 1 do not overlap with each other. For example, the axially shifted state includes a state in which the apex of the parabola deviates from the optical axis 1 and the optical axis 1 and the axis of the parabola included in the cross-sectional shape is in parallel with each other. This is a state in which the parabola is moved in parallel from a state in which the axis of the parabola coincides with the optical axis 1. Further, the axially shifted state includes a state in which the optical axis 1 and the axis of the parabola included in the cross-sectional shape intersect at a predetermined angle at the apex of the parabola. This is a state in which the parabola is caused to rotate with reference to the apex from the state in which the axis of the parabola coincides with the optical axis 1. In addition, a state in which the parabola is moved in parallel and caused to rotate is also included in the axially shifted state.

For example, by appropriately setting the orientation, position, and shape (e.g., the degree of parabola opening and focal length) of the first parabola, it is possible to form the first reflection region 42a for emitting a substantially-parallel light beam of the incident angle $\theta_A$.

The second reflection region 42b is configured to be capable of emitting a substantially-parallel light beam (the second light beam 43b) of the incident angle $\theta_B$. In the example shown in FIG. 4, the second reflection region 42b is configured by using a curved line obtained by cutting out a part of a parabola. Hereinafter, the parabola constituting the second reflection region 42a will be referred to as a second parabola. FIG. 4 schematically illustrates, by using coarse dotted lines, a curved shape obtained by cutting out the second parabola constituting the second reflection region 42b.

The cross-sectional shape in the plane including the optical axis 1 of the second reflection region 42b is configured to be a part of the second parabola that has an apex protruding upward and is axially shifted from the optical axis 1. Note that the second parabola is, for example, a parabola having a focal length and the like different from those of the first parabola. Further, the axial shifting of the second parabola is different from the axial shifting of the first parabola. For example, it is possible to form the second reflection region 42b for emitting a substantially-parallel light beam of the incident angle $\theta_B$ by appropriately setting the orientation, position, shape, and the like of the second parabola.

The first reflection region 42a and the second reflection region 42b are connected to each other so that there is no large step. Accordingly, the cross section of the reflection mirror 40 has a shape in which the curve obtained by cutting out the first parabola and the curve obtained by cutting out the second parabola are connected to each other.

FIG. 5 is a schematic graph illustrating the diffraction characteristics of the screen 30 (the transmission hologram 33). The vertical axis of the graph indicates the diffraction efficiency, and the horizontal axis of the graph indicates the incident angle of the screen 30 with respect to the inner peripheral surface 31.

The diffraction efficiency of the screen 30 has a steep peak structure 36 (angle distribution) with respect to the incident angle. In FIG. 5, the peak structure 36 of the diffraction efficiency of the screen 30 is schematically illustrated. The diffraction angle range 4, the transmission angle range, and the like described referring to FIG. 2 are set in accordance with this peak structure 36. For example, the angle range in which the diffraction efficiency is higher than the predetermined threshold in the peak structure 36 is set as the diffraction angle range 4, and the other angle range is set as the transmission angle range.

The screen 30 is appropriately configured so that for example, the diffraction efficiency has a peak value at the incident angle $\theta_A$ (see FIG. 2). Therefore, the first light beam 43a that has entered the inner peripheral surface 31 at the incident angle $\theta_A$ will be diffracted with sufficiently high diffraction efficiency. As a result, it is possible to increase the brightness of the diffused light 3 emitted from the outer peripheral surface 32, and display a bright image on the screen 30.

The incident angle $\theta_B$ is set to be an angle deviating from the peak structure 36 of the diffraction efficiency. That is, the incident angle $\theta_B$ is set within the range in which light is transmitted through the screen 30 (the transmission angle range) avoiding the diffraction angle range 4 where diffraction due to the screen 30 occurs. Therefore, the second light beam 43b that has entered the inner peripheral surface 31 at the incident angle $\theta_B$ is transmitted through the screen 30 substantially without being diffracted by the screen 30, and applied onto the external irradiation region 12.

In the example shown in FIG. 4, the second light beam 43b is incident overlapping the range in which the first light beam 43a is incident. Even in such a case, the second light beam 43b is transmitted through the screen 30 substantially without being diffracted. For this reason, the second light beam 43b does not affect the entire circumference image or the like displayed by the first light beam 43a. That is, in the range in which the respective light beams overlap and are incident, diffraction and transmission are realized at the same time.

As described above, in the reflection mirror 40 shown in FIG. 4, the substantially-parallel light beam (the first light beam 43a) of the incident angle $\theta_A$ is emitted from the first reflection region 42a disposed on the periphery, and the substantially-parallel light beam (the second light beam 43b) of the incident angle $\theta_B$ is emitted from the second reflection region 42b disposed at the center. Then, the first light beam 43a displays an entire circumference image on the cylindrical the screen 30, and the second light beam 43b displays an indicator or the like on the external irradiation region 12 on the disposition surface 11.

For example, by appropriately setting the value of the incident angle $\theta_B$, it is possible to easily change the position of the external irradiation region 12, i.e. the display position of the indicator or the like. In addition, by using a substantially-parallel light beam as the second light beam 43b, it is possible to increase the brightness and the like of an image displayed on the external irradiation region 12, and display a bright indicator or the like. As a result, it is possible to display an image with high quality on the external irradiation region 12.

Note that the positions of the boundaries of the first and second reflection regions 42a and 42b, i.e., the sizes (areas) of the respective regions are appropriately set so that, for example, an image can be displayed on the screen 30 at a desired resolution. For example, the image light 21 reflected at a reflection position within the first reflection region 42a in the vicinity of the boundary with the second reflection region 42b is displayed on the lower end of the screen 30. The positions of the boundaries of the respective reflection region are set so that an image is displayed at an appropriate resolution on the lower end. In addition, the method of setting the positions of the boundaries of the respective reflection regions are not limited.

Figure 6:
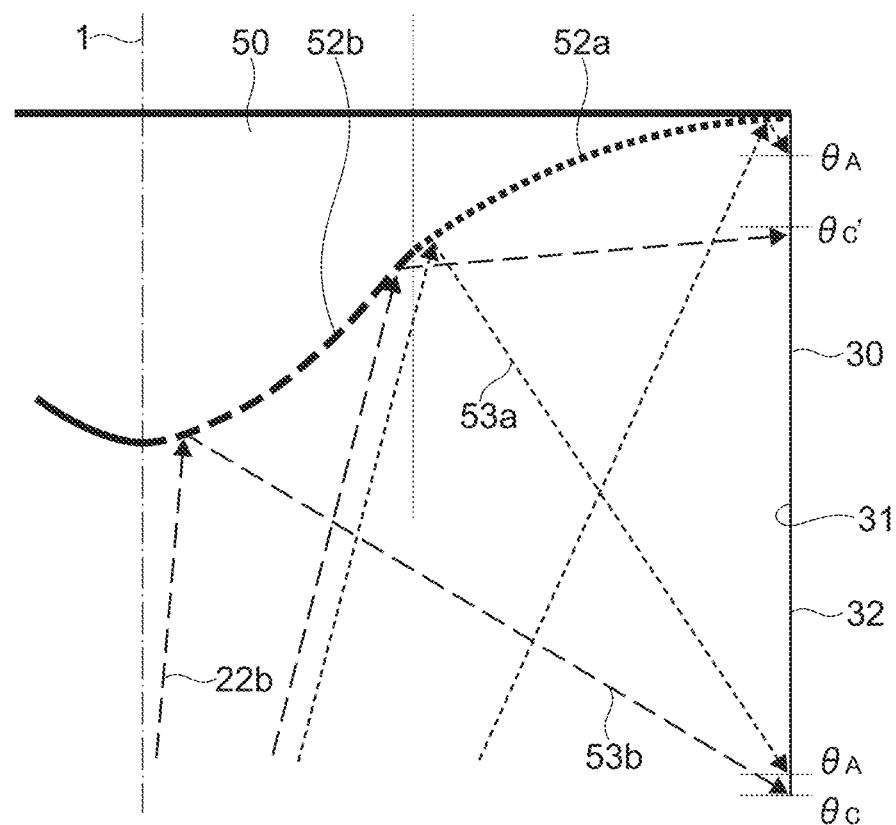
FIG. 6 is a schematic diagram showing another configuration example of the reflection mirror.
Figure 7:
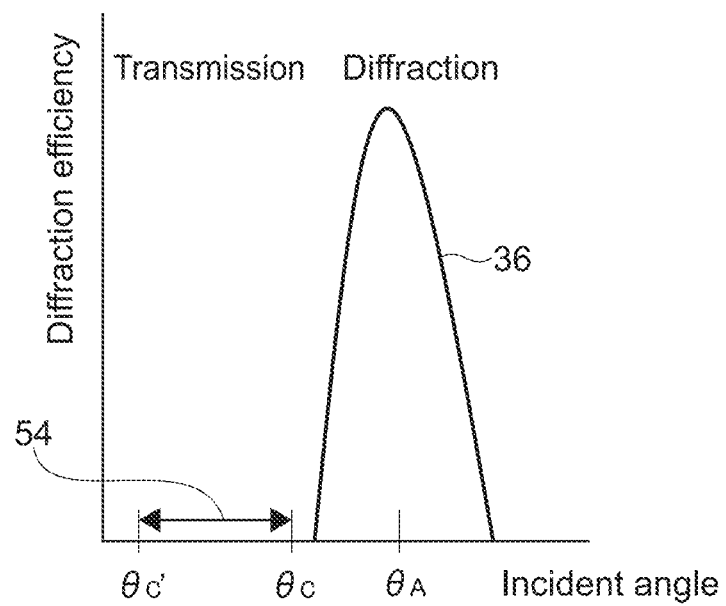
FIG. 7 is a graph showing the relationship between the incident angle of image light reflected by the reflection mirror shown in FIG. 6 and the diffraction efficiency of a screen.

FIG. 6 is a schematic diagram showing another configuration example of the reflection mirror. FIG. 7 is a graph showing the relationship between the incident angle of the image light 21 reflected by a reflection mirror 50 shown in FIG. 6 and the diffraction efficiency of the screen 30. In the configuration example shown in FIG. 6, a screen having a configuration similar to that of the screen 30 described in FIG. 4 is used.

A first reflection region 52a is configured to be capable of emitting a substantially-parallel light beam (first light beam 53a) of the incident angle $\theta_A$. In the example shown in FIG. 6, the first reflection region 52a is configured by using a curved line obtained by cutting out a part of a parabola. Hereinafter, the parabola constituting the first reflection region 52a will be referred to as a third parabola. The first reflection region 52a is configured similarly to the first reflection region 42a shown in FIG. 4, for example. That is, the above-mentioned first parabola and the third parabola are the same parabola.

A second reflection region 52b is configured to be capable of emitting a divergent light beam (second light beam 53b). The second reflection region 52b is configured to have a shape in which the cross-sectional shape of the plane including the optical axis 1 is a protruding shape when viewed from the light emission unit 20. In the example shown in FIG. 6, the cross-sectional shape of the second reflection region 52b in the plane including the optical axis 1 is configured to be a part of a parabola that has an apex on the optical axis 1 and protrudes downward. Hereinafter, the parabola constituting the second reflection region 52b will be referred to as a fourth parabola.

As shown in FIG. 6, the second reflection region 52b has a shape expanded toward the side where the image light 21 enters. As a result, it is possible to easily emit the image light 21 (the second projection light 22b) as a divergent light beam. In addition, by using the fourth parabola with the optical axis 1 as the symmetric axis as the cross-sectional shape, it is possible to control the incident angle with respect to the inner peripheral surface 31 of a ray of light include in the divergent light beam with high accuracy.

The first reflection region 52a and the second reflection region 52b are connected to each other so that there is no large step. Accordingly, the cross section of the reflection mirror 50 has a shape in which the curve obtained by cutting out the third parabola and the curve obtained by cutting out the fourth parabola are connected to each other.

In the fourth parabola, positions, shapes, and the like of apexes are set so that the second light beam 53b, which is a divergent light beam, is incident in the angle range in which the second light beam 53b is transmitted through the screen 30. That is, the second reflection region 52b is configured so that the rays of light included in the second light beam 53b are transmitted through the screen 30.

For example, as shown in FIG. 7, an incident angle range 54 that does not overlap with the peak structure 36 of the diffraction efficiency of the screen 30 is set. In FIG. 7, the incident angle range 54 set to the range from an incident angle $\theta_c$ to the incident angle $\theta_c'$ is schematically illustrated. The incident angles $\theta_c$ and $\theta_c'$ are angles that are not included in the peak structure 36 (the diffraction angle range 4), i.e. within the transmission angle range. The size and the like of the incident angle range 54 are not limited, and for example, the incident angle range 54 may be set to an arbitrary angle range that does not overlap with the peak structure 36.

The fourth parabola is appropriately set and the second reflection region 52b is configured so that the second light beam 53b enters the screen 30 within the set incident angle range 54. This allows the second reflection region 52b to emit a divergent light beam that enters the inner peripheral surface 31 within the transmission angle range as the second light beam 53b. The divergent light beam (the second light beam 53b) that has entered the screen 30 is not diffracted by the screen 30 and passes through the screen 30 as it is.

Even in the case where a divergent light beam is used as the second light beam 53b, it is possible to emit the second light beam 53b outward without being diffracted by the screen 30. The second light beam 53b is used for, for example, illumination for producing an entire circumference image or the like displayed on the screen 30. In addition, various effects can be performed by appropriately setting the application range, the application direction, and the like of the divergent light beam.

As described above, in the reflection mirror 40 shown in FIG. 6, the substantially-parallel light beam (the first light beam 53a) of the incident angle $\theta_A$ is emitted from the first reflection region 52a disposed on the periphery, and the divergent light beam (the second light beam 53b) having an incident angle of $\theta_c$ to $\theta_c'$ is emitted from the second reflection region 52b disposed at the center. Then, the first light beam 53a displays an entire circumference image on the cylindrical the screen 30, and the second light beam 53b displays illumination for performance, or the like. As a result, it is possible to provide a viewing experience with high entertainment.

Figure 8:
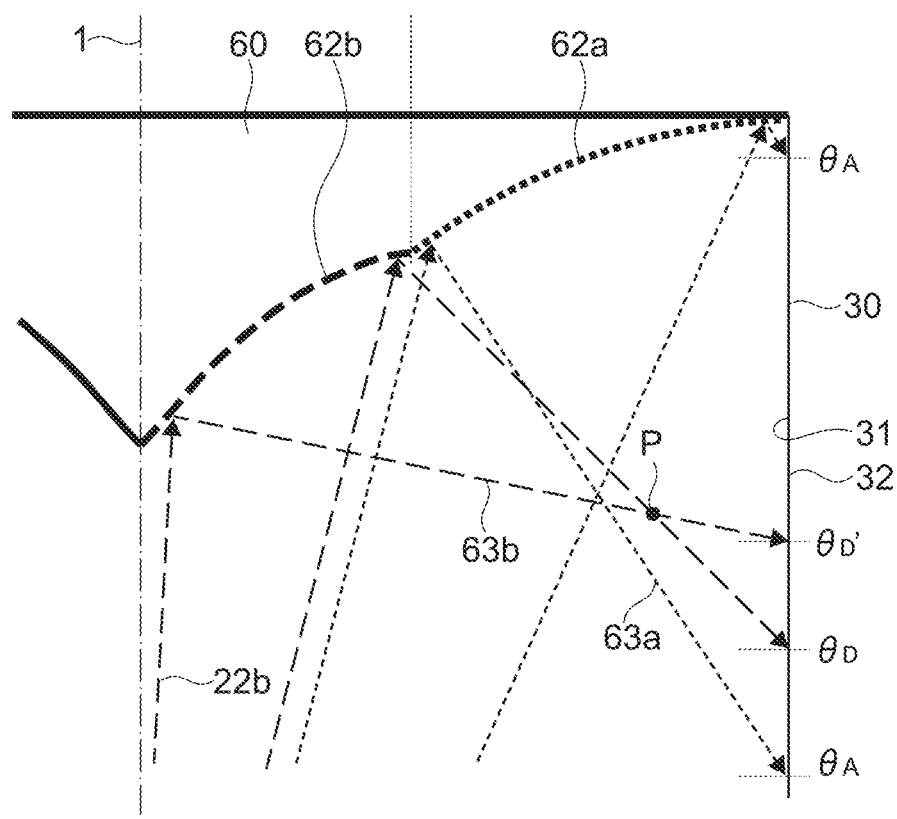
FIG. 8 is a schematic diagram showing another configuration example of the reflection mirror.
Figure 9:
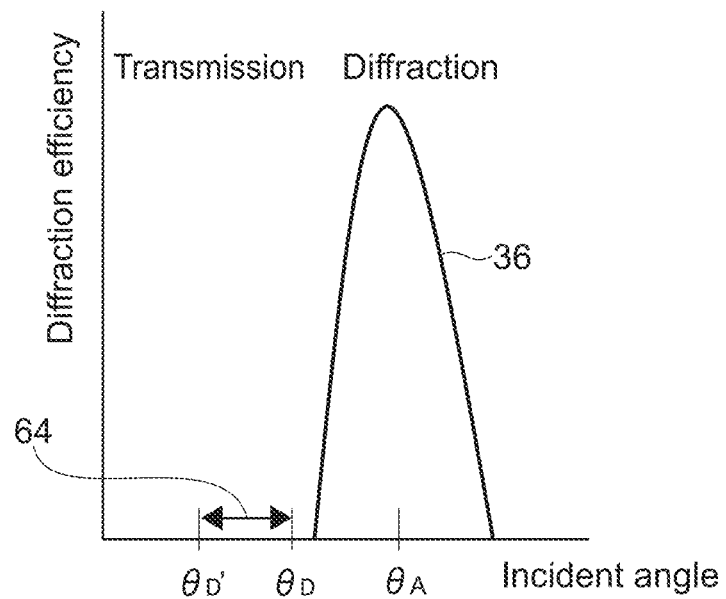
FIG. 9 is a graph showing the relationship between the incident angle of image light reflected by the reflection mirror shown in FIG. 8 and the diffraction efficiency of a screen.

FIG. 8 is a schematic diagram showing another configuration example of the reflection mirror. FIG. 9 is a graph showing the relationship between the incident angle of the image light 21 reflected by a reflection mirror 60 shown in FIG. 8 and the diffraction efficiency of the screen 30. In the configuration example shown in FIG. 8, a screen having a configuration similar to that of the screen 30 described in FIG. 4 is used.

A first reflection region 62a is configured to be capable of emitting a substantially-parallel light beam (first light beam 63a) of the incident angle $\theta_A$. In the example shown in FIG. 8, the first reflection region 62a is configured by using a curved line obtained by cutting out a part of a parabola. Hereinafter, the parabola constituting the first reflection region 62a will be referred to as a fifth parabola. The first reflection region 62a is configured similarly to the first reflection region 42a shown in FIG. 4, for example. That is, the above-mentioned first parabola and the fifth parabola are the same parabola.

A second reflection region 62b is configured to be capable of emitting a converging light beam (second light beam 63b). The second reflection region 62b is configured to have a shape in which the cross-sectional shape of the plane including the optical axis 1 is a recessed shape when viewed from the light emission unit 20. Therefore, as shown in FIG. 8, the second reflection region 62b has a recessed shape when viewed from the side where the image light 21 enters.

The cross-sectional shape of the second reflection region 62b is designed so that for example, the reflected image light is condensed at a predetermined position (condensing position P). That is, in the cross section including the optical axis 1, the recessed cross-sectional shape is set so that the image light 21 reflected by the second reflection region 62b passes through the condensing position P. This cross-sectional shape can be appropriately set using, for example, an arc shape, a parabola, a free curve, or the like.

In the example shown in FIG. 8, the condensing position P is set inside the image display apparatus 100 (the screen 30). In this case, the light that has passed through the condensing position P enters the inner peripheral surface 31 of the screen 30 as a divergent light beam. Note that it is possible to set the focusing position P to the outside of the image display apparatus 100. In this case, the image light 21 enters the inner peripheral surface 31 as a converging light beam.

Thus, by setting the condensing position P, for example, it is possible to easily control the incident angle with respect to the inner peripheral surface 31 of the ray of light included in the converging light beam emitted from the second reflection region 62b. Note that the present technology is not limited to the case of setting the condensing position P, and for example, the second reflection region 62b may be configured so that the reflected image light is condensed in a predetermined range (condensing range) instead of the condensing position P.

The first reflection region 62a and the second reflection region 62b are connected to each other so that there is no large step. Therefore, the cross section of the reflection mirror 60 has a shape in which the curve obtained by cutting out the fifth parabola and the recessed curve are connected to each other.

The recessed cross-sectional shape of the second reflection region 62b is set so that the second light beam 63b, which is a converging light beam, is incident within an angle range in which the second light beam 63b is transmitted through the screen 30. That is, the second reflection region 62b is configured so that the rays of light included in the second light beam 63b are transmitted through the screen 30.

For example, as shown in FIG. 9, an incident angle range 64 that does not overlap with the peak structure 36 of the diffraction efficiency of the screen 30 is set. In FIG. 9, the incident angle range 64 set to the range from the incident angle $\theta_D$ to the incident angle $\theta_D'$ is schematically illustrated. The incident angles $\theta_D$ and $\theta_D'$ are angles that are not included in the peak structure 36 (the diffraction angle range 4), i.e. within the transmission angle range. The size and the like of the incident angle range 64 are not limited, and for example, the incident angle range 64 may be set to an arbitrary angle range that does not overlap with the peak structure 36.

The recessed cross-sectional shape is appropriately set and the second reflection region 62b is configured so that the second light beam 63b enters the screen 30 within the set incident angle range 64. As a result, the second reflection region 62b is capable of emitting a converging light beam that enters the inner peripheral surface 31 within the transmission angle range as the second light beam 63b. The converging light beam (the second light beam 63b) that has entered the screen 30 passes through the screen 30 as it is without being diffracted by the screen 30.

Even in the case where a converging light beam is used as the second light beam 63b, it is possible to emit the second light beam 63b outward without being diffracted by the screen 30. For example, as shown in FIG. 8, in the case where the condensing position P is set inside the screen 30, it is possible to display brightly illumination or the like for producing an entire circumference image, and exhibit a performance effect with a wide dynamic range.

Further, for example, by emitting a converging light beam that converges toward the disposition surface 12 such as a table and a floor, it is possible to increase the brightness or the like of an image displayed on the external irradiation region 12 (see FIG. 1). This makes it possible to display a sufficiently bright indicator or the like. As a result, it is possible to realize display of additional information or the like having excellent visibility, and exhibit high usability. In addition, various effects can be performed by appropriately setting the condensing position P (condensing range), the application direction, and the like of the converging light beam.

As described above, in the image display apparatus 100 according to this embodiment, the image light 21 emitted from the light emission unit 20 along the optical axis 1 enters the reflection mirror 40 disposed facing the light emission unit 20. The reflection mirror 40 is provided with the plurality of reflection regions 42. The image light 21 that has entered the plurality of reflection regions 42 is divided into a plurality of light beams 43 and reflected toward the screen 30 disposed at least partially around the optical axis 1. In this manner, by dividing and applying the image light 21, it is possible to realize highly entertaining image display on the entire circumference screen or the like.

As a method of performing image display on the entire circumference screen, a method of projecting an image or the like using the entire reflection surface of the rotator mirror is conceivable. In this case, since the light reflected in the vicinity of the center of the rotator mirror is enlarged and projected on the entire circumference screen, there is a possibility that the brightness and resolution are reduced.

Figure 10:
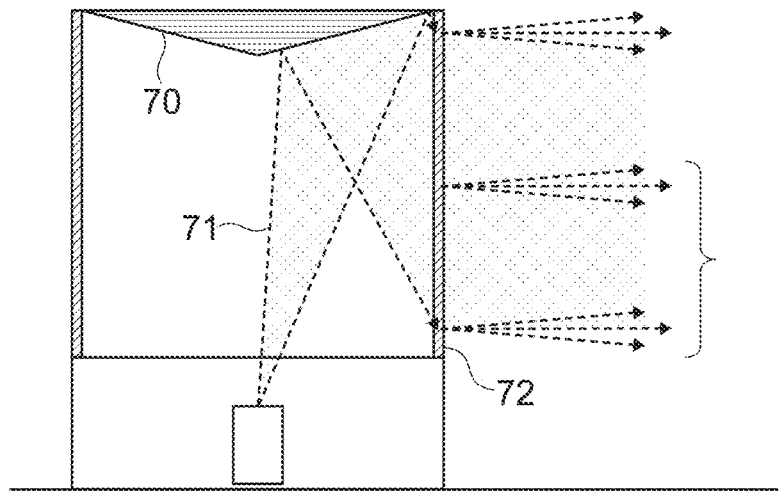
FIG. 10 is a schematic diagram showing a configuration example of an image display apparatus according to Comparative Example.

FIG. 10 is a schematic diagram showing a configuration example of an image display apparatus given as Comparative Example. In the image display apparatus shown in FIG. 10, a ray of light 71 reflected in the vicinity of the center of a rotator mirror 70 is reflected toward the lower end of a screen 72.

As described with reference to FIG. 3, image light projected in the vicinity of the center of the rotator mirror 70 has a small amount of information. Further, the ray of light 71 (image light) reflected in the vicinity of the center of the rotator mirror 70 is greatly enlarged before reaching the screen 72 as compared with the case where the ray of light 71 is reflected on the periphery of the rotator mirror 70. For this reason, the pixels at the lower end of the screen 72 become coarse, which may lead to a decrease in resolution.

Further, since the magnification is high, the luminance is reduced in some cases. As a result, there is a possibility that image display on the screen 72 is deteriorated.

For example, a method of suppressing the deterioration of the image display by not using image light projected in the vicinity of the center of the rotator mirror 70 is conceivable. In this case, for example, image data or the like in which image light projected onto the center is made black so as not to be illuminated is used. Therefore, since image light that is not used for image display on the screen 72 is projected, there is a possibility that unnecessary data processing or the like occurs.

As a method of displaying an indicator or the like in the periphery of the device, a method of incorporating another display apparatus for displaying the indicator or the like is conceivable in addition to image display on the entire circumference screen. In this case, it is necessary to newly provide a light source or the like.

Figure 11:
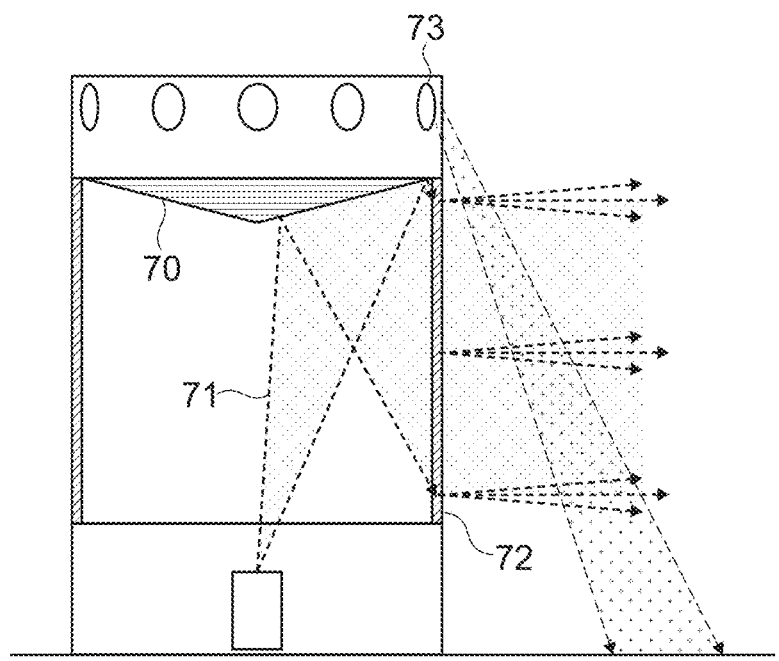
FIG. 11 is a schematic diagram showing a configuration example of another image display apparatus according to Comparative Example.

FIG. 11 is a schematic diagram showing a configuration example of another image display apparatus given as an Comparative Example. In the image display apparatus shown in FIG. 11, a light source 73 for displaying an indicator or the like on the desktop is provided at the top of image display apparatus. In this case, since another light source 73 or the like is used, there is a possibility that the costs of the image display apparatus increases. Further, there may be a case where the device size increases by newly adding the light source 73 or the like.

In the image display apparatus 100 according to this embodiment, the reflection mirror 40 is provided with the first reflection region 42a and the second reflection region 42b. The first reflection region 42a emits the first light beam 43a that displays an entire circumference image or the like, and the second reflection region 42a emits the second light beam 43b that displays an indicator or the like. By emitting light beams separately for each reflection region as described above, it is possible to realize high-quality image display on the screen 30, display an indicator or the like, and thus exhibit high entertainment. As a result, it is possible to provide a high-value-added image display apparatus.

The first reflection region 42a is provided on the periphery of the reflection mirror 40 and the second reflection region 42b is provided on the periphery of the reflection mirror 40. As a result, it is possible to display an entire circumference image or the like using image light suitable for displaying on the screen 30, and realize sufficiently-high-quality image display with high resolution and brightness.

Further, the second reflection region 42b is configured so that the second light beam 43b reflected by the second reflection region 42b has an incident angle at which the second light beam 43b is transmitted through the screen 30. As a result, it is possible to display an indicator, a subtitle, illumination, and the like by using the image light 21 projected onto the center. That is, it is possible to display content or the like suitable for the image light 21 by using the image light 21 that is unsuitable for the display on the screen 30.

As a result, it is possible to utilize the image light 21 projected onto the center, and suppress generation of unnecessary data processing or the like. In addition, since the image light 21 emitted from the light emission unit 20 can be used as it is, it is possible to add a function of displaying an indicator or the like without newly providing a light source or the like. As a result, it is possible to provide the image display apparatus 100 exhibiting excellent amusement without increasing device sizes, device costs, and the like. As a result, it is possible to create a new value for a display apparatus such as a cylindrical display.

Second Embodiment

An image display apparatus according to a second embodiment of the present technology will be described. In the following, description of configurations and operations similar to those in the image display apparatus 100 described in the above-mentioned embodiment will be omitted or simplified.

Figure 12:
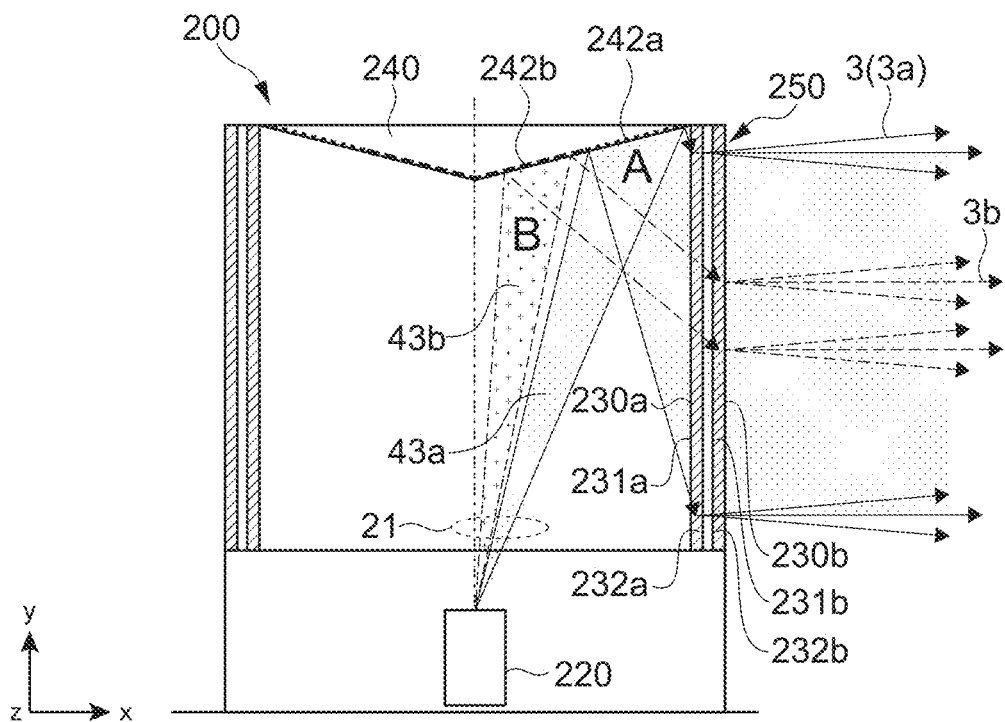
FIG. 12 is a diagram schematically showing the appearance of an image display apparatus according to second embodiment of the present technology.

FIG. 12 is a diagram schematically showing the appearance of an image display apparatus 200 according to the second embodiment of the present technology. The image display apparatus 200 is a cylindrical display apparatus that displays an entire circumference image displayed in all directions of 360 degrees. The image display apparatus 200 includes a light emission unit 220, a screen unit 250, and a reflection mirror 240. Note that the light emission unit 220 and the reflection mirror 240 are configured similarly to the light emission unit 20 and the reflection mirror 40 shown in FIG. 1, for example.

The screen unit 250 includes a first screen 230a and a second screen 230b. The first screen 230a has a cylindrical shape and is disposed over the entire circumference of the optical axis 1. The first screen 230a includes a first inner peripheral surface 231a inside the cylindrical shape and a first outer peripheral surface 232a outside the cylindrical shape.

The first screen 230a includes the transmission hologram 33 having a diffusing function. Further, the first screen 230a is configured to most efficiently diffract light that enters the first inner peripheral surface 231a at the incident angle $\theta_A$. That is, the diffraction efficiency of the first screen 230a has angle distribution (peak structure) that takes a peak value at the incident angle $\theta_A$.

Therefore, the first inner peripheral surface 231a functions as a diffusion surface that diffuses light entering the first inner peripheral surface 231a at the incident angle $\theta_A$. In this embodiment, the incident angle $\theta_A$ corresponds to the first angle, and the first inner peripheral surface 231a corresponds to the first diffusion surface. The first screen 230a is configured similarly to the screen 30 shown in FIG. 1, for example.

The second screen 230b has a cylindrical shape and is disposed outside the first screen 230a with a predetermined space over the entire circumference around the optical axis 1. The second screen 230b includes a second inner peripheral surface 231b inside the cylindrical shape and a second outer peripheral surface 232b outside the cylindrical shape.

The second screen 230b includes the transmission hologram 33 having a diffusing function. Further, the second screen 230b is configured to most efficiently diffract the light that has entered the second inner peripheral surface 231b at the incident angle $\theta_B$. That is, the diffraction efficiency of the second screen 230b has angle distribution (peak structure) that takes a peak value at the incident angle $\theta_B$.

Therefore, the second inner peripheral surface 231b functions as a diffusion surface that diffuses light entering the second inner peripheral surface 231b at the incident angle $\theta_B$. In this embodiment, the incident angle $\theta_B$ corresponds to the second angle, and the second inner peripheral surface 231b corresponds to the second diffusion surface.

In this way, the screen unit 250 is a cylindrical double screen with the first screen 230a disposed inside and the second screen 230b disposed outside. For example, the first screen 230a is attached to the inside of a cylindrical transparent member having a predetermined thickness, and the second screen 230b is attached to the outside. For example, such a configuration is possible.

Figure 13:
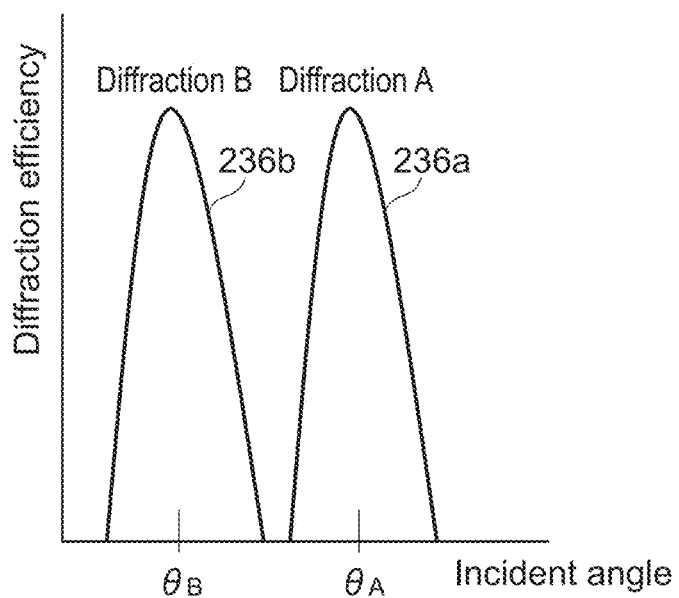
FIG. 13 is a schematic diagram showing an example of the diffraction efficiency of a screen unit.

FIG. 13 is a schematic diagram showing an example of the diffraction efficiency of the screen unit 250. In FIG. 13, the angle distribution (first peak structure 36a) of the diffraction efficiency of the first screen 230a and the angle distribution (second peak structure 36b) of the diffraction efficiency of the second screen 230b are schematically illustrated.

For example, the first screen 230a is configured so that the first peak structure 236a has a peak value at the incident angle $\theta_A$. In this case, the second screen 230b is appropriately configured so that the second structure 236b has a peak value at the incident angle $\theta_B$ different from the incident angle $\theta_A$. Typically, the incident angle $\theta_B$ is set so that the second structure 236b does not overlap the first peak structure 236a. Note that the incident angle $\theta_B$ can be set so that the first peak structure 236a and the second structure 236b partially overlap within the range in which the image display on the screen unit 250 can be performed properly.

For example, the first screen 230a diffracts the light incident at the incident angle $\theta_A$ at a high ratio, and causes the light incident at the incident angle $\theta_B$ to be transmitted therethrough substantially without being diffracted. The second screen 230b diffracts the light incident at the incident angle $\theta_B$ at a high ratio, and causes the light incident at the incident angle $\theta_A$ to be transmitted therethrough substantially without being diffracted. As a result, it is possible to configure a double screen for selectively diffracting the light of the set incident angles.

With reference to FIG. 12 again, in a first reflection region 242a of the reflection mirror 240, the image light 21 emitted from the light emission unit 220 is reflected, and the first light beam 43a of the incident angle $\theta_A$ is emitted. The first light beam 43a enters the first inner peripheral surface 231a of the first screen 230a, is diffracted by the interference fringes recorded on the first screen 230a, and is emitted from the first outer peripheral surface 232a as the diffused light 3. Hereinafter, the diffused light 3 emitted from the first screen 230a (the first outer peripheral surface 232a) will be referred to as the first diffused light 3a.

The first diffused light 3a enters the second inner peripheral surface 231b of the second screen 230b. The diffusion range of the first diffused light 3a is appropriately set so as to be an angle range which is not diffracted by the second screen 230b, for example. Thus, the first diffused light 3a is transmitted through the second screen 230b and emitted from the second outer peripheral surface 232b. As a result, the user outside the screen unit 250 can visually recognize an entire circumference image or the like displayed on the first screen 230a.

Further, in a second reflection region 242b of the reflection mirror 240, the image light 21 emitted from the light emission unit 220 is reflected, and the second light beam 43b of the incident angle $\theta_B$ is emitted. The second light beam 43b enters the first inner peripheral surface 231a of the first screen 230a, passes through the first screen 230a, and is emitted from the first outer peripheral surface 232a.

The second light beam 43b that has been transmitted through the first screen 230a enters the second inner peripheral surface 231b of the second screen 230b. The second light beam 43b is diffracted by the interference fringes recorded on the second screen 230b and emitted from the second outer peripheral surface 232b as the diffused light 3. Hereinafter, the diffused light 3 emitted from the second screen 230b (the second outer peripheral surface 232b) will be referred to as the second diffused light 3b.

As a result, an image of a subtitle, a telop, an icon, or the like is displayed on the second screen 230b by the second diffused light 3. Note that as shown in FIG. 12, the region irradiated with the second light beam 43b (the region from which the second diffused light 3b is emitted) overlaps with the region in which the entire circumference image or the like is displayed. Therefore, the user can visually recognize the image displayed by the second diffused light 3b, which is superimposed on the image on the entire circumference image or the like. Hereinafter, an image displayed by the second diffused light 3b will be referred to as a superimposed image.

As described above, the entire circumference image and the superimposed image are respectively displayed on the first screen 230a and the second screen 230b. As a result, for example, it is possible to perform video representation using an entire circumference image with a high resolution, and display a caption, an icon, a background, and the like thereon. As a result, it is possible to superimpose video on a transparent screen unit 250, and realize highly entertaining image display.

In addition, by appropriately setting the interval (the thickness of the transparent member, or the like) between the first screen 230a and the second screen 230b, it is possible to superimpose floating video or the like on the transparent screen unit 250. As a result, it is possible to perform video representation with a floating feeling and a depth, and exhibit an excellent visual effect.

Figure 14:
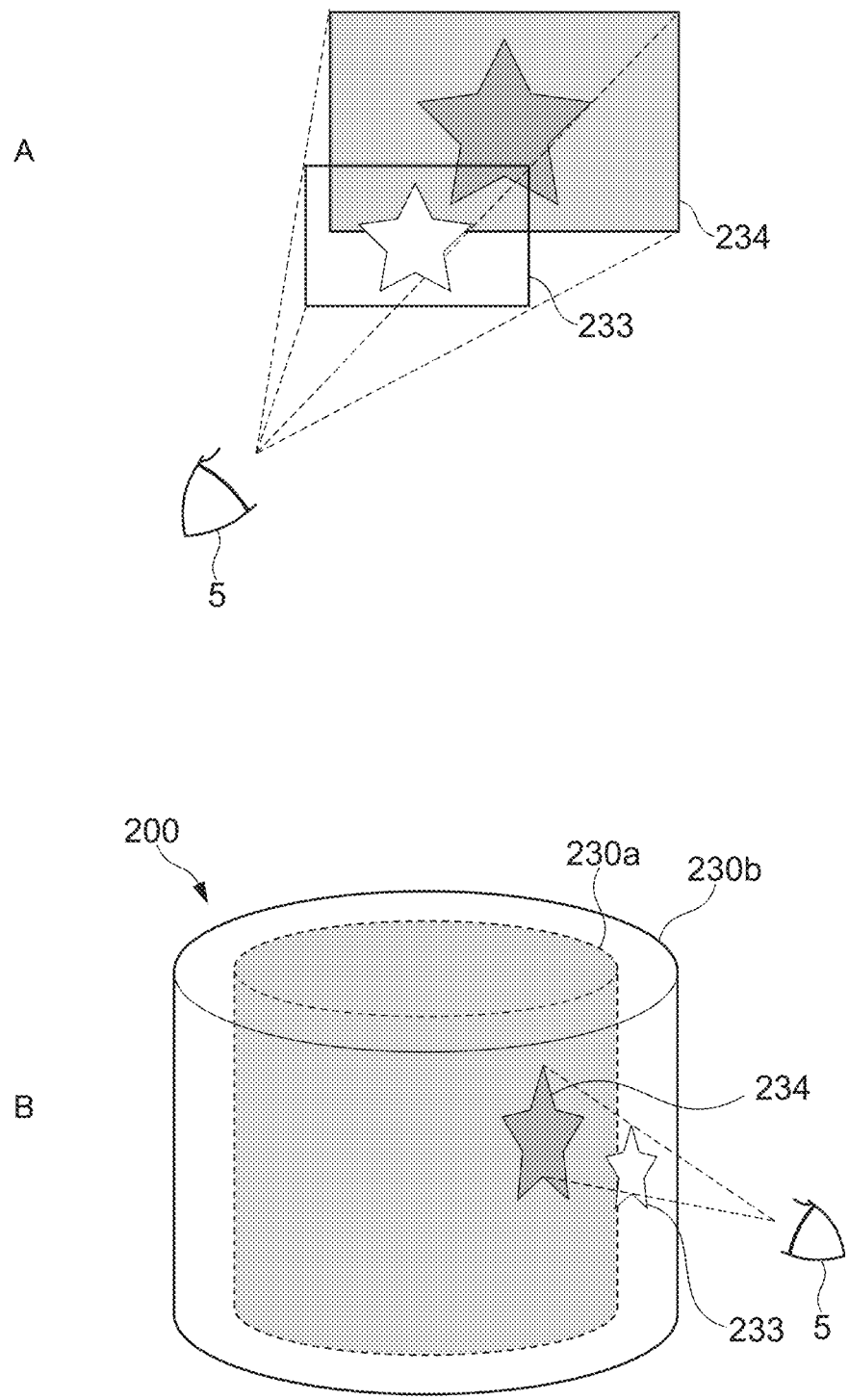
FIG. 14 is a schematic diagram for describing an example of image display using an image display apparatus.

FIG. 14 is a schematic diagram for describing an example of image display using the image display apparatus 200. Part A of FIG. 14 is a schematic diagram showing an example of a stereoscopic view on a plane. Part B of FIG. 14 is a schematic diagram showing an example of a stereoscopic view using a cylindrical screen unit 250. In the screen unit 250 of the double structure, stereoscopic vision using DFD (Depth-Fused-3D) or the like can be realized by using the interval between the first and second screens 230a and 230b.

DFD is a method of realizing stereoscopic vision by presenting a depth. As shown in Part A of FIG. 14, in the field of view of a user 5, two transparent planar images (2D videos or the like) are placed one behind the other. As the planar image, for example, an image obtained by two-dimensionally projecting a displayed three-dimensional object is used. When viewing a front image 233 displayed in front and a rear image 234 displayed in rear, the user 5 recognizes (optical illusion) the images not as two images but as one image fused in the depth direction. That is, the displayed image is perceived as stereoscopic vision.

Part B of FIG. 14 schematically illustrates a display example of the cylindrical screen unit 250 for stereoscopic viewing using DFD. For example, the rear image 234 is displayed on the first screen 230a and the front image 233 is displayed on the second screen 230b so as to overlap with the rear image. The user 5 can perceive the images as one stereoscopic image by visually recognizing the front image 233 and the rear image 234 in a superimposed manner.

In this way, by using the screen unit 250 of the double structure in which two transmission hologram 33 are combined, it is possible to provide a viewing experience in which a stereoscopic image appears to be floating in the air. As a result, it is possible to exhibit an excellent visual effect by using one video source (the light emission unit 220).

Note that the order, interval, and the like of the first screen 230a and the second screen 230b are not limited. For example, the second screen 230b may be disposed inside and the first screen 230a may be disposed outside. This makes it possible to display a superimposed image or the like with a depth raised on the back surface. Further, for example, the interval (the width of the transparent member, or the like) of each screen may be appropriately set so as to be capable of realizing a desired visual effect (stereoscopic vision or the like). Alternatively, a configuration in which the first screen 230a and the second screen 230b are attached to each other without an interval therebetween may be adopted. In addition, the specific configuration of the screen unit 250 is not limited.

Third Embodiment

Figure 15:
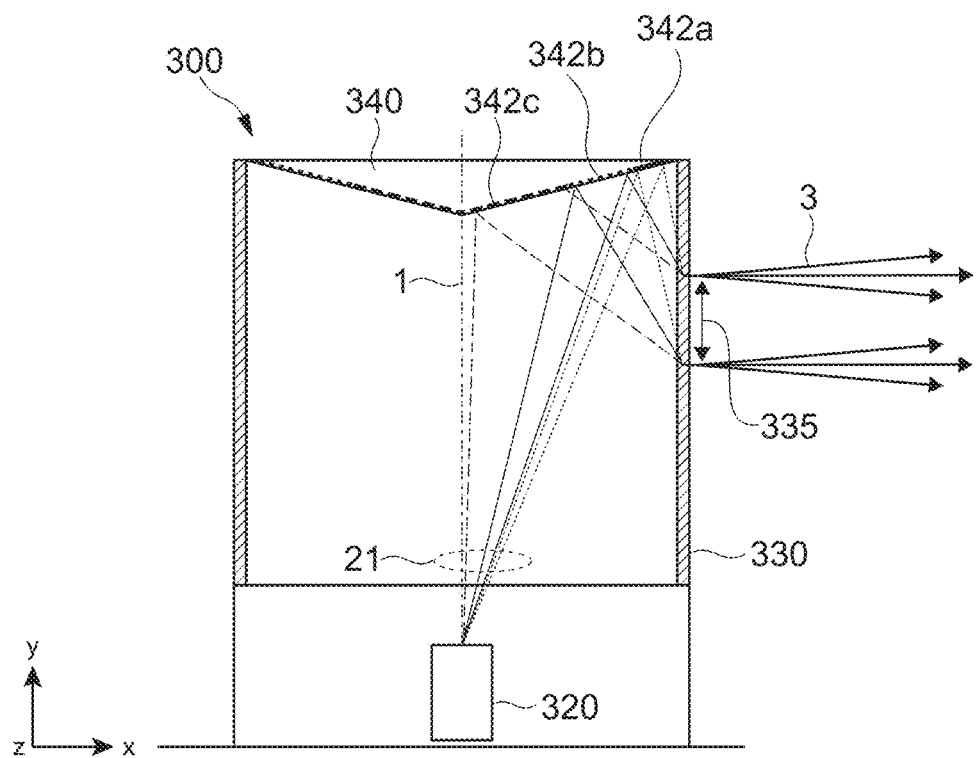
FIG. 15 is a diagram schematically showing the appearance of an image display apparatus according to a third embodiment of the present technology.

FIG. 15 is a diagram schematically showing the appearance of an image display apparatus 300 according to a third embodiment of the present technology. The image display apparatus 300 is a cylindrical display apparatus that displays an entire circumference image displayed in all directions of 360 degrees. The image display apparatus 300 includes a light emission unit 320, a screen 330, and a reflection mirror 340. Note that the light emission unit 320 is configured similarly to the light emission unit 20 shown in FIG. 1, for example.

The screen 330 has a cylindrical shape and is disposed over the entire circumference around the optical axis 1 of the light emission unit 320. The screen 330 includes the transmission hologram 33 having a diffusing function. On the screen 330, for example, interference fringes exposed by incident reference light at three incident angles are recorded. Further, when exposure is performed at each incident angle, different wavelengths are used as the exposure wavelengths of the reference light. That is, interference fringes are recorded by changing the incident angle for each wavelength using the reference light of three types of exposure wavelengths. Recording of interference fringes (exposure) is performed, for example, three times.

As the reference light, red light R (wavelength of approximately 630 nm), green light G (wavelength of approximately 530 nm), and blue light R (wavelength of approximately 455 nm) are used. For example, the red light R, the green light G, and the blue light B respectively enter the transmission hologram 33 at an incident angle $\theta_r$, an incident angle $\theta_g$, and an incident angle $\theta_B$, and the interference fringes corresponding to the respective wavelengths are exposed. Note that the respective incident angles satisfy the following relationship: $\theta_r < \theta_g < \theta_B$, and the values thereof are set in accordance with the irradiation region 335 described below. As the object light, diffused light having the same wavelength as that of the reference light is used. Note that as the incident angle of the object light (diffused light), the same angle is used for the respective wavelengths.

For example, when the red light R enters the screen 330 at the incident angle $\theta_r$, the red light R is diffracted at the peak value of the diffraction efficiency, and is emitted as a red diffused light 3. Similarly, the blue light B and the green light G that are incident at the incident angle $\theta_B$ and the incident angle $\theta_g$ are diffracted with the respective largest diffraction efficiencies, and are respectively emitted as a green diffused light 3 and blue diffused light 3. Thus, the screen 330 is configured to diffuse light of different wavelengths, which is incident at a different angle. Note that another method may be used to configure the screen 330.

The reflection mirror 340 has a first reflection region 342a, a second reflection region 342b, and a third reflection region 342c. The respective reflection regions are disposed from the center of the reflection mirror 340 (the optical axis 1) to the outer periphery in the order of the third reflection region 342c, the second reflection region 342b, and the first reflection region 342a.

The first reflection region 342a is configured to be capable of reflecting the image light 21 and emitting a substantially-parallel light beam that enters the screen 330 at the incident angle $\theta_B$. The second reflection region 342b is configured to be capable of reflecting the image light 21 and emitting a substantially-parallel light beam that enters the screen 330 at the incident angle $\theta_g$. The third reflection region 342c is configured to be capable of reflecting the image light 21 and emitting a substantially-parallel light beam that enters the screen 330 at the incident angle $\theta_r$.

Note that the incident angle $\theta_r$, the incident angle $\theta_g$, and the incident angle $\theta_B$ are set so that substantially-parallel light beams emitted from the respective reflection regions enter an irradiation region 335 provided on the screen 330. For example, the incident angle $\theta_r$, the incident angle $\theta_g$, and the incident angle $\theta_B$ are set on the basis of the arrangement of the irradiation region 335 and the respective reflection regions so that the substantially-parallel light beam is emitted to the same range. In this embodiment, the irradiation region 335 corresponds to the predetermined irradiation range.

FIG. 15 schematically illustrates the state in which the image light 21 reflected by the first to third reflection regions 342a to 342c enters the irradiation region 335 set on the screen 330. The position where the irradiation region 335 is provided, the size of the irradiation region 335, and the like are not limited, and may be set as appropriate.

By the light emission unit 320, the image light 21 of different colors (wavelengths) is projected toward the corresponding reflection region. For example, a blue image light 21 is projected on the first reflection region 342a, and a blue substantially-parallel light beam is emitted from the first reflection region 342a toward the irradiation region 335. Further, a green image light 21 is projected on the second reflection region 342b, and a green substantially-parallel light beam is emitted from the second reflection region 342b toward the irradiation region 335. Further, a red image light 21 is projected on the third reflection region 342c, and a red substantially-parallel light beam is emitted from the third reflection region 342c toward the irradiation region 335.

Thus, in this embodiment, the first to third reflection regions 342a to 342c respectively emit blue, green, and red substantially-parallel light beams of different wavelengths to the irradiation region 335 on the screen 330. Therefore, the blue, green, and red substantially-parallel light beams emitted from the respective reflection regions enter the irradiation region 335.

The substantially-parallel light beams of the respective colors that have entered the irradiation region 335 are diffracted with high-diffraction efficiency, and are emitted as diffused light. As a result, R, G, and B images are superimposed and displayed on the irradiation region 335. Note that the image light 21 of the respective colors of R, G, and B emitted from the light emission unit 320 is appropriately configured so that, for example, color images and the like are displayed on the irradiation region 335 on the screen 330. As a result, it is possible to display a bright color image or the like with high brightness on the irradiation region 335.

In this manner, by utilizing the high-incident-angle-selectivity of the transmission hologram 33 (the screen 330), it is possible to improve the brightness and the like of an image. As a result, for example, it is possible to ensure a high dynamic range, and display a high-quality entire circumference image or the like with high visibility on the entire circumferential screen or the like.

Fourth Embodiment

Figure 16:
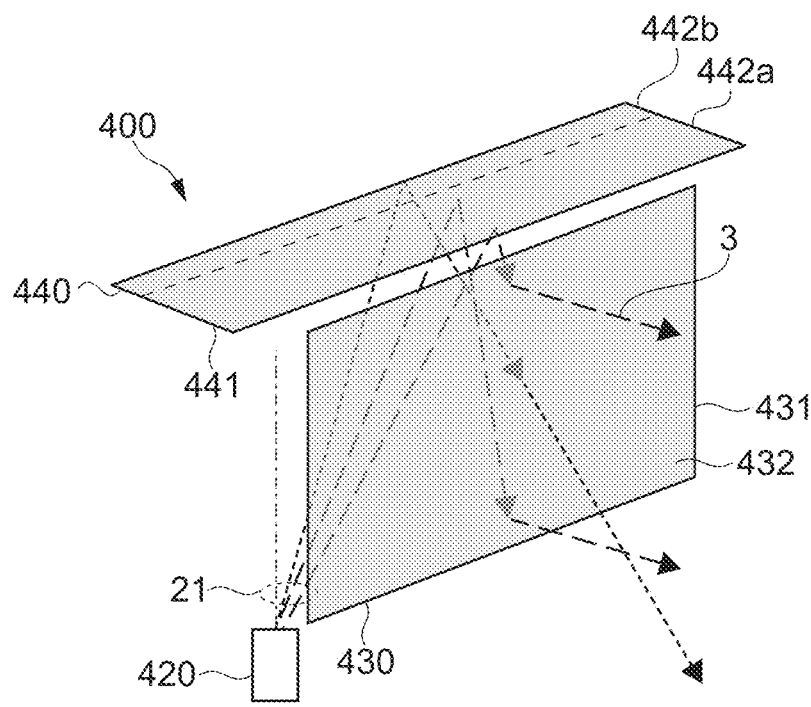
FIG. 16 is a diagram schematically showing the appearance of an image display apparatus according to a fourth embodiment of the present technology.

FIG. 16 is a diagram schematically showing the appearance of an image display apparatus 400 according to a fourth embodiment of the present technology. The image display apparatus 400 includes a light emission unit 420, a screen 430, and a reflection mirror 440. As shown in FIG. 16, a planar screen 430 is used in the image display apparatus 400. Hereinafter, the plane direction in which the image display apparatus 400 is disposed is defined as the horizontal direction, and the direction perpendicular to the horizontal direction is defined as the up-and-down direction. The thickness direction of the screen 430 is defined as the front-back direction.

The light emission unit 420 is disposed on the lower side of the image display apparatus 400 and emits the image light 21 upward. The screen 430 has a planar shape and is disposed in parallel with the up-and-down direction. The screen 430 has an inner surface 431 on which the image light 21 incident and an outer surface 432 opposite thereto.

Further, the screen 430 includes the transmission hologram 33 having a diffusing function. The screen 430 is configured to, for example, diffract the light that has entered the inner surface 431 at the incident angle $\theta_A$, and emit the diffracted light from the outer surface 432 as the diffused light 3. Note that light incident at an angle away from the incident angle $\theta_A$ is transmitted through the screen 430 as it is. In this embodiment, the inner surface 431 corresponds to the first diffusion surface.

The reflection mirror 440 includes a first reflection region 442a and a second reflection region 442b. The first reflection region 442a is configured to reflect the image light 21 emitted from the light emission unit 420 and emit a substantially-parallel light beam that enters the inner surface 431 of the screen 430 at the incident angle $\theta_A$. That is, in the first reflection region 442a, the image light 21 is reflected toward the inner surface 431 along the same direction (direction of entering the inner surface 431 at the incident angle $\theta_A$) from the respective reflection positions where the image light 21 is reflected.

The first reflection region 442a is configured so that, for example, the cross-sectional shape in a plane (hereinafter, referred to as a center plane) that includes the optical axis 1 and is parallel to the up-and-down direction and the front-rear direction includes a line segment obtained by cutting out a part of a parabola having an apex facing upward.

The cross-sectional shape of the first reflection region 442a on another plane parallel to the center plane is appropriately designed in accordance with, for example, a distance (depth) from the center plane, and the like with reference to the parabola in the center plane. The present technology is not limited thereto, and an arbitrary method capable of configuration the first reflection region 442a may be used.

For example, a method such as calculating a minute reflection surface that reflects each of the vectors in a desired direction for each vector representing the emission direction of each pixel constituting the image light 21 may be used. In this case, for example, the entire reflection surface can be configured by simulating a minute reflection surface on which the Z component (the depth component) of the vector is made zero and the ratio of the X component and the Y component is substantially constant.

The second reflection region 442b is configured to reflect the image light 21 emitted from the light emission unit 420 and emit a substantially-parallel light beam that enters the inner surface 431 of the screen 430 at the incident angle $\theta_B$. The incident angle $\theta_B$ is set to, for example, an angle at which the light is not diffracted by the screen 430 and is transmitted through the screen 430. The second reflection region 442b is appropriately configured so as to, for example, use a method similar to the method of configuring the first reflection region 442a to be capable of emitting a substantially-parallel light beam of the incident angle $\theta_B$.

As shown in FIG. 16, the substantially-parallel light beam of the incident angle $\theta_A$ emitted from the first reflection region 442a of the reflection mirror 440 is diffracted by the screen 430 and emitted as the diffused light 3 from the outer surface 432. As a result, an image is displayed on a plane-shaped transparent screen 430. Further, the substantially-parallel light beam of the incident angle $\theta_B$ emitted from the second reflection region 442b is transmitted through the screen 430, and is applied to a disposition surface such as a table and floor. As a result, it is possible to display an indicator and the like on the outside of the image display apparatus 400.

As described above, even in the case where the planar screen 430 is used, it is possible to achieve diffraction and transmission on the screen 430 at the same time, and display an image on the screen 430 and an indicator and the like on the outside of the device. As a result, it is possible to provide a high-value-added image display apparatus 400.

In addition, the present technology is not limited to the case of using a transmission hologram, and for example, the screen 430 including a reflective hologram may be used.

In the screen 430 using a reflective hologram, for example, the light incident at the incident angle $\theta_A$ with high diffraction efficiency is emitted as diffused light from the surface where the light enters. That is, the light incident at the incident angle $\theta_A$ is diffusely reflected by the screen 430. Further, for example, light incident at the incident angle $\theta_B$ not subjected to diffraction is transmitted through the screen 430, and applied to a disposition surface or the like.

As described above, in the case where the reflective hologram is used, an image is displayed on the side of the inner surface 431 where the light beam enters. Further, an indicator and the like are displayed on the disposition surface (table, floor, etc.) on the side of the outer surface 432. As a result, for example, it is possible to use one light source to display the main content on the screen 430, and an indicator and the like on the floor or the like on the back side thereof.

Note that the shape of the screen 430 is not limited to a planar shape. For example, the screen 430 having a semi-cylindrical shape, the screen 430 having an arbitrary shape including an arbitrary curved surface shape, or the like may be used. Even in such a case, by appropriately configuring the reflection mirror 440 in accordance with the shape of the screen 430, it is possible to display an image on the screen 430 as well as an indicator and the like.

Out of the feature parts according to the present technology described above, at least two feature parts can be combined. In other words, various features described in the respective embodiments may be combined discretionarily regardless of the embodiments. Further, the various effects described above are not limitative but are merely illustrative, and other effects may be provided.

Note that the present technology may also take the following configurations.

(1) An image display apparatus, including:
a light emission unit that emits image light along a predetermined axis;
an object to be irradiated disposed at least partially around the predetermined axis; and
a reflection portion that is disposed facing the light emission unit with reference to the predetermined axis and has a plurality of reflection regions that divides the emitted image light into a plurality of light beams and reflects the light beams toward the object to be irradiated.

(2) The image display apparatus according to (1), in which
the plurality of reflection regions includes a first reflection region that reflects the image light and emits a first light beam, and a second reflection region that reflects the image light and emits a second light beam traveling along a direction different from that of the first light beam.

(3) The image display apparatus according to (2), in which
the object to be irradiated has a first diffusion surface that diffuses light entering the first diffusion surface at a first angle, and
the first reflection region emits a substantially-parallel light beam that enters the first diffusion surface at the first angle as the first light beam.

(4) The image display apparatus according to (3), in which
the first reflection region is configured to have a shape of a parabola in which a cross-sectional shape of a plane including the predetermined axis is a recessed shape when viewed from the light emission unit, and an axis of the parabola and the predetermined axis are different from each other.

(5) The image display apparatus according to (3) or (4), in which
the first light beam is a light beam that displays a main image.

(6) The image display apparatus according to any one of (3) to (5), in which
the first diffusion surface causes light that has entered the object to be irradiated within a second angle range to be transmitted therethrough, the second angle range being different from a first angle range including the first angle, and
the second reflection region reflects the image light and emits the second light beam that enters the first diffusion surface within the second angle range.

(7) The image display apparatus according to (6), in which
the second reflection region emits, as the second light beam, a substantially-parallel light beam that enters the first diffusion surface at a second angle included in the second angle range.

(8) The image display apparatus according to (7), in which
the object to be irradiated has a second diffusion surface that diffuses light entering the object to be irradiated at the second angle.

(9) The image display apparatus according to (6), in which
the second reflection region emits, as the second light beam, a divergent light beam that enters the first diffusion surface within the second angle range.

(10) The image display apparatus according to (9), in which
the second reflection region has a shape in which a cross-sectional shape of a plane including the predetermined axis is a protruding shape when viewed from the light emission unit.

(11) The image display apparatus according to (6), in which
the second reflection region emits, as the second light beam, a converging light beam that enters the first diffusion surface within the second angle range.

(12) The image display apparatus according to (11), in which
the second reflection region has a shape in which a cross-sectional shape of a plane including the predetermined axis is a recessed shape when viewed from the light emission unit.

(13) The image display apparatus according to any one of (3) to (11), in which
the second light beam is a light beam that displays at least one of a sub-image, a superimposed image, an indicator, or illumination.

(14) The image display apparatus according to any one of (2) to (13), in which
the reflection portion has a rotation surface with reference to the predetermined axis, and
the plurality of reflection regions is provided on the rotation surface.

(15) The image display apparatus according to (14), in which
the first reflection region is disposed on a periphery of the rotation surface, and
the second reflection region is disposed at a center of the rotation surface.

(16) The image display apparatus according to (1), in which
the object to be irradiated diffuses light of different wavelengths entering the object to be irradiated at different angles, and
the plurality of reflection regions emits the plurality of light beams of different wavelengths to a predetermined irradiation range on the object to be irradiated.

(17) The image display apparatus according to any one of (1) to (16), in which
the object to be irradiated is disposed over the entire circumference around the predetermined axis.

(18) The image display apparatus according to any one of (1) to (17), in which
the object to be irradiated has a cylindrical shape with the predetermined axis as a central axis.

(19) The image display apparatus according to any one of (1) to (18), in which
the object to be irradiated is a screen using a diffractive optical element.

REFERENCE SIGNS LIST 1 optical axis
2, 2a, 2b incident light
3, 3a, 3b diffused light
4 diffraction angle range
20, 220, 320, 420 light emission unit
21, 21p, 21q image light
30, 330, 430 screen
31 inner peripheral surface
32 outer peripheral surface
33 transmission hologram
40, 50, 60, 240, 340, 440 reflection mirror
41 reflection surface
42a, 52a, 62a, 242a, 442a first reflection region
42b, 52b, 62b, 242b, 442b second reflection region
43a, 53a, 63a first light beam
43b, 53b, 63b second light beam
250, screen unit
231a first inner peripheral surface
231b second inner peripheral surface
100, 200, 300, 400 image display apparatus

The invention claimed is:

1. An image display apparatus, comprising:
   a light emission unit that emits image light along a predetermined axis;
   an object to be irradiated disposed at least partially around the predetermined axis; and
   a reflection portion that is disposed facing the light emission unit with reference to the predetermined axis and has a plurality of reflection regions that divides the emitted image light into a plurality of light beams and reflects the light beams toward the object to be irradiated, wherein the plurality of reflection regions includes a first reflection region and a second reflection region with a different shape than the first reflection region.

2. The image display apparatus according to claim 1, wherein
   the first reflection region reflects the image light and emits a first light beam, and the second reflection region reflects the image light and emits a second light beam traveling along a direction different from that of the first light beam.

3. The image display apparatus according to claim 2, wherein
   the object to be irradiated has a first diffusion surface that diffuses light entering the first diffusion surface at a first angle, and
   the first reflection region emits a substantially-parallel light beam that enters the first diffusion surface at the first angle as the first light beam.

4. The image display apparatus according to claim 3, wherein
   the first reflection region is configured to have a shape of a parabola in which a cross-sectional shape of a plane including the predetermined axis is a recessed shape when viewed from the light emission unit, and an axis of the parabola and the predetermined axis are different from each other.

5. The image display apparatus according to claim 3, wherein
   the first light beam is a light beam that displays a main image.

6. The image display apparatus according to claim 3, wherein
   the first diffusion surface causes light that has entered the object to be irradiated within a second angle range to be transmitted therethrough, the second angle range being different from a first angle range including the first angle, and
   the second reflection region reflects the image light and emits the second light beam that enters the first diffusion surface within the second angle range.

7. The image display apparatus according to claim 6, wherein
   the second reflection region emits, as the second light beam, a substantially-parallel light beam that enters the first diffusion surface at a second angle included in the second angle range.

8. The image display apparatus according to claim 7, wherein
   the object to be irradiated has a second diffusion surface that diffuses light entering the object to be irradiated at the second angle.

9. The image display apparatus according to claim 6, wherein
   the second reflection region emits, as the second light beam, a divergent light beam that enters the first diffusion surface within the second angle range.

10. The image display apparatus according to claim 9, wherein
    the second reflection region has a shape in which a cross-sectional shape of a plane including the predetermined axis is a protruding shape when viewed from the light emission unit.

11. The image display apparatus according to claim 6, wherein
    the second reflection region emits, as the second light beam, a converging light beam that enters the first diffusion surface within the second angle range.

12. The image display apparatus according to claim 11, wherein
    the second reflection region has a shape in which a cross-sectional shape of a plane including the predetermined axis is a recessed shape when viewed from the light emission unit.

13. The image display apparatus according to claim 3, wherein
    the second light beam is a light beam that displays at least one of a sub-image, a superimposed image, an indicator, or illumination.

14. The image display apparatus according to claim 2, wherein
    the reflection portion has a rotation surface with reference to the predetermined axis, and
    the plurality of reflection regions is provided on the rotation surface.

15. The image display apparatus according to claim 14, wherein
    the first reflection region is disposed on a periphery of the rotation surface, and
    the second reflection region is disposed at a center of the rotation surface.

16. The image display apparatus according to claim 1, wherein
    the object to be irradiated diffuses light of different wavelengths entering the object to be irradiated at different angles, and
    the plurality of reflection regions emits the plurality of light beams of different wavelengths to a predetermined irradiation range on the object to be irradiated.

17. The image display apparatus according to claim 1, wherein
    the object to be irradiated is disposed over the entire circumference around the predetermined axis.

18. The image display apparatus according to claim 1, wherein
    the object to be irradiated has a cylindrical shape with the predetermined axis as a central axis.

19. The image display apparatus according to claim 1, wherein
    the object to be irradiated is a screen using a diffractive optical element.

* * * * *